(12) United States Patent
Marangon et al.

(10) Patent No.: US 11,034,402 B2
(45) Date of Patent: Jun. 15, 2021

(54) BICYCLE CONTROL DEVICE

(71) Applicant: Campagnolo S.r.l., Vicenza (IT)

(72) Inventors: Christian Marangon, Thiene (IT); Fabiano Fossato, Campagna Lupia (IT)

(73) Assignee: Campagnolo S.r.l., Vicenza (IT)

(*) Notice: Subject to any disclaimer, the term of this patent is extended or adjusted under 35 U.S.C. 154(b) by 21 days.

(21) Appl. No.: 16/419,675

(22) Filed: May 22, 2019

(65) Prior Publication Data
US 2019/0367131 A1 Dec. 5, 2019

(30) Foreign Application Priority Data
Jun. 1, 2018 (IT) .................. 102018000005937

(51) Int. Cl.
| B62J 45/40 | (2020.01) |
| B62K 23/02 | (2006.01) |
| B62M 25/08 | (2006.01) |
| F16H 59/02 | (2006.01) |
| F16H 59/68 | (2006.01) |
| F16H 59/04 | (2006.01) |

(52) U.S. Cl.
CPC .............. B62J 45/40 (2020.02); B62K 23/02 (2013.01); B62M 25/08 (2013.01); F16H 59/02 (2013.01); F16H 59/044 (2013.01); F16H 59/68 (2013.01); *F16H 2059/026* (2013.01)

(58) Field of Classification Search
None
See application file for complete search history.

(56) References Cited

U.S. PATENT DOCUMENTS

| 6,057,657 | A | 5/2000 | Kitamura | |
| 10,095,309 | B2* | 10/2018 | Chen | G06F 3/014 |
| 10,852,835 | B2* | 12/2020 | Yetkin | A61F 2/583 |
| 2012/0139708 | A1* | 6/2012 | Paradiso | G06F 3/0346 340/10.1 |
| 2014/0085177 | A1* | 3/2014 | Lyons | G06F 3/014 345/156 |
| 2014/0214285 | A1* | 7/2014 | Wesling | F16H 59/02 701/51 |
| 2017/0060237 | A1* | 3/2017 | Pellaton | G06K 7/10366 |
| 2017/0296363 | A1* | 10/2017 | Yetkin | G06F 3/015 |
| 2019/0187835 | A1* | 6/2019 | Griffin | H03K 17/962 |

FOREIGN PATENT DOCUMENTS

| CN | 107 219 928 A | 9/2017 |
| KR | 2016 0012393 A | 2/2016 |
| WO | 2018/030887 A1 | 2/2018 |

OTHER PUBLICATIONS

Italian Search Report and Written Opinion in Italian Application No. 102018000005937, dated Feb. 25, 2019, with English translation.

* cited by examiner

*Primary Examiner* — Prasad V Gokhale
(74) *Attorney, Agent, or Firm* — Volpe Koenig

(57) ABSTRACT

A wearable control unit for controlling a piece of equipment of a bicycle has a power source and a sensor powered by the power source. The sensor detects targets that are physically distinct and separate from the control unit and not electrically connected to the control unit by a wire. The control unit generates and emits an electrical command in response to a change of state of the sensor brought about by entry of the target into the sensor's detection range, and/or in response to the target exiting from the detection range of the sensor.

20 Claims, 13 Drawing Sheets

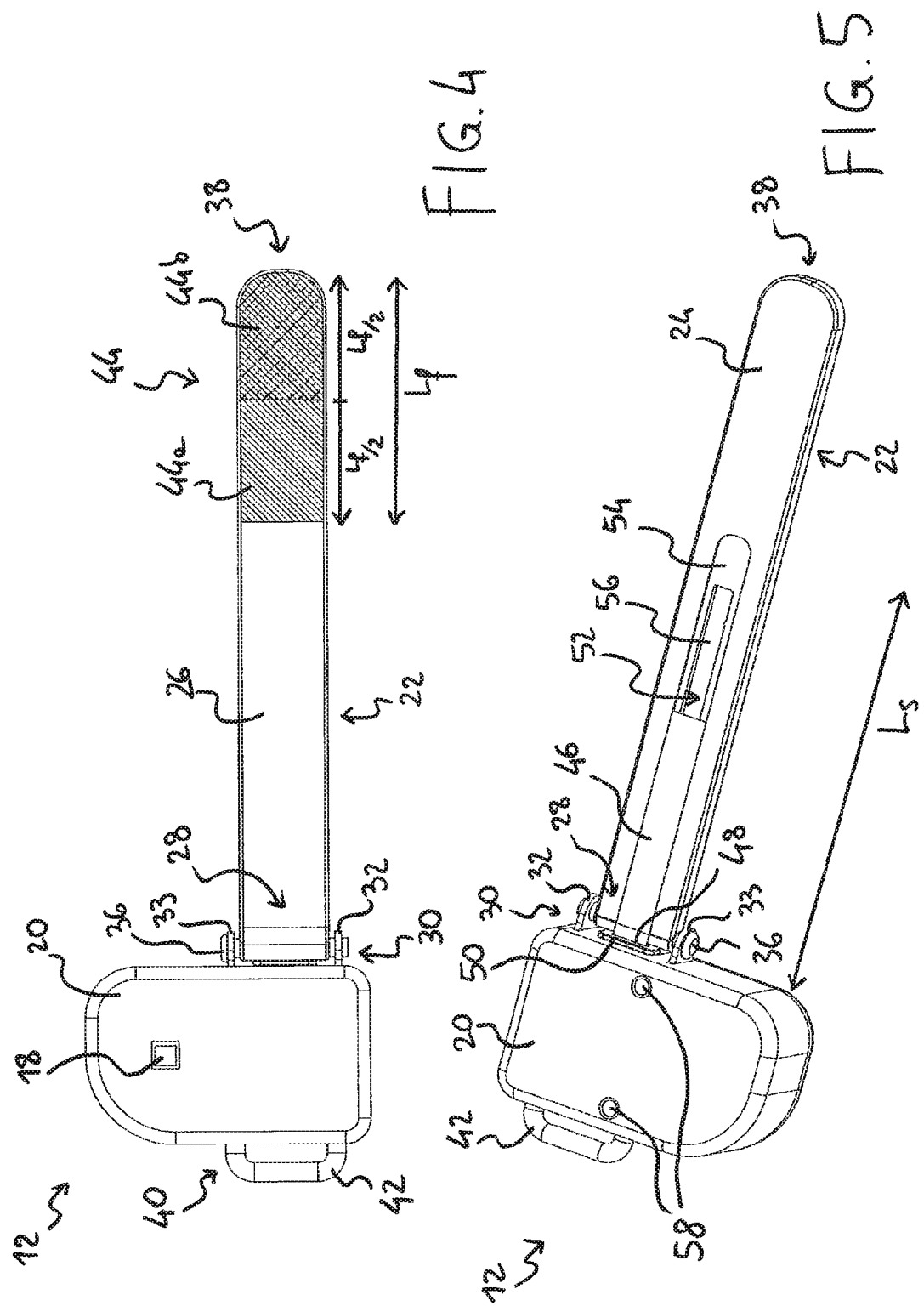

BICYCLE CONTROL DEVICE

CROSS REFERENCE TO RELATED APPLICATION

This application claims the benefit of Italian Application No. 102018000005937, filed on Jun. 1, 2018, which is incorporated herein by reference as if fully set forth.

FIELD OF INVENTION

The present invention relates to a bicycle control device. The present invention relates, more in particular, to a bicycle control device for imparting at least one command to at least one electromechanical or electric-electronic piece of equipment of the bicycle, such as a derailleur, a suspension, a saddle configuration adjuster or a cycle-computer.

BACKGROUND

Known bicycle control devices comprise a support body adapted to be fixed close to or at a handgrip portion of the handlebar of the bicycle, and carrying one or more manual actuation members, of the lever type, namely actuated with a rotary movement, or of the pushbutton type, namely actuated with a linear movement, actuatable with one finger or with plural fingers to impart commands to bicycle equipment.

US 2014/0214285 A1 discloses a wearable control device comprising at least one wearable control sensor generating input signals when actuated, a control processor in communication therewith, generating control signals responsive to the input signals, a wireless transmitter transmitting the control signals, and a power source connected to the (shift) control processor and to the wireless transmitter. In an embodiment, an electronic control unit comprising the processor, the transmitter and the power source is worn on the cyclist's hand, for example through a glove, and two conductive pads are electrically connected thereto through conductive wires, conductive fabrics or another conductive material or compound, and are worn on respective fingers of the hand, for example through the glove. When the conductive pads are brought into contact, a circuit changes state and the control signal is emitted. In another embodiment, a pressure-sensitive piezo-resistive sensing device is electrically connected to the electronic control unit and worn on the fingertip or on the finger pad area, again through the glove, so that when the cyclist pushes down on the sensor, the electrical resistance thereof changes and the control signal is generated; alternatively, it can be a mechanical switch.

The Applicant observes that in all cases, it is necessary to have a permanent electrical connection between the electronic control unit worn on the palm and the components worn on the fingers, which can be particularly uncomfortable for the cyclist besides being subject to a high risk of interruption of the wired connection.

The technical problem at the basis of the present invention is to provide a control device for easily imparting a command during normal use of the bicycle to a bicycle piece of equipment, which avoids such drawbacks and which can also relieve the cyclist of the need to take up a fixed and predetermined position.

SUMMARY

The disclosure describes a wearable control apparatus with an emitting unit that emits an electrical command to control a piece of bicycle equipment that is not electrically connected by a wire to the emitting unit. The emitting unit emits an electrical command in response to a change of state of the sensor and/or in response to a change of state of the sensor brought about a target leaving the detection range of the sensor.

BRIEF DESCRIPTION OF THE DRAWINGS

Further features and advantages of the present invention will become clearer from the following detailed description of some preferred embodiments thereof, made with reference to the attached drawings. The different features illustrated and described with reference to the single configurations can be combined with each other as desired. In the following description, for the illustration of the figures identical or analogous reference numerals are used to indicate structural or functional elements with the same function or analogous function. In the drawings:

FIG. 4 is a plan view of the component shown in FIG. 3, on a first side;

FIG. 5 is a perspective view of the component shown in FIG. 3, on a second side;

DETAILED DESCRIPTION OF THE PREFERRED EMBODIMENTS

Figure 1:
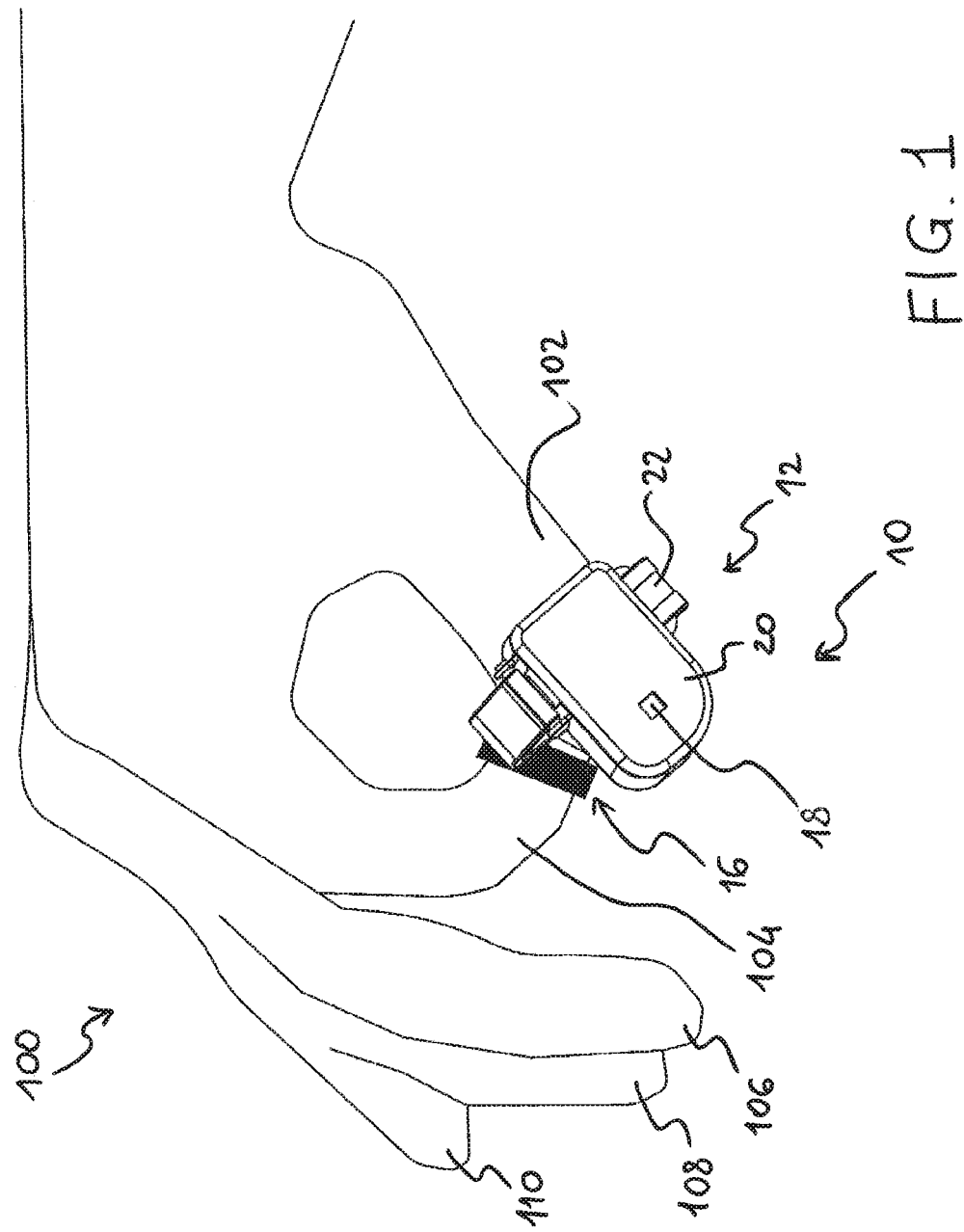
FIG. 1 shows a bicycle control device according to a first embodiment of the invention, worn on a hand.

In the present description and in the attached claims, the expression "bicycle control device for imparting at least one command" or briefly "control device" refers to a control device capable of imparting one or more electric-electronic commands to one or more electromechanical or electric-electronic piece of equipment of the bicycle, such as a derailleur, a suspension, a saddle configuration adjuster, a cycle-computer, and similar, in response to an action of a user.

Under "detection range" of the sensor, in the present description and in the attached claims, the maximum distance at which the sensor still detects the presence of the target shall be meant to be indicated. It can also be a zero distance, and in this case the sensor is a contact sensor, but preferably it is a non-zero maximum distance, and in this case the sensor is a proximity sensor.

In one aspect, the invention relates to a bicycle control device, comprising:

a wearable control unit for generating and emitting at least one electrical command to at least one piece of equipment of a bicycle, comprising a power source and a sensor powered by the power source, wherein:

the device comprises a target of the sensor, physically distinct and separate from the control unit, and not electrically connected to the control unit, the sensor is a sensor for detecting the target, having a detection range, and the control unit generates and emits one of said at least one electrical command in response to a change of state of the sensor brought about by entry of the target into the detection range of the sensor, and/or in response to a change of state of the sensor brought about by exit of the target from the detection range of the sensor.

Therefore, the sensor emits a specific command, for example an upward gearshifting command of a derailleur, in response to one of the changes of state of the sensor between a state in which the target is at a distance from the sensor within the detection range and a state in which the target is at a distance from the sensor outside of the detection range, said change being brought about by a mutual movement of the target and the sensor.

Depending on preferences, the electrical command, for example an upward gearshifting command of a derailleur, can be emitted upon the change of state of the sensor brought about by entry of the target into the detection range of the sensor or vice-versa upon the change of state of the sensor brought about by exit thereof from the detection range.

It could be useful, depending on the type of equipment, for the electrical command to emit two different commands, one upon the change of state of the sensor brought about by entry of the target into the detection range of the sensor, and one upon the change of state of the sensor brought about by exit thereof from the detection range, or for the electrical command to generate and emit a same command upon both changes of state.

The control device of the invention is particularly easy to actuate since it is sufficient for the target to approach the sensor, if necessary until they contact each other, and enter into the detection range of the sensor, or, respectively, for it to move away from the sensor exiting from the detection range; given that the sensor is directly worn, the movement thereof is particularly easy. Furthermore, given that the target is not electrically connected to the control unit and in particular it is not permanently powered, it can advantageously be arranged in any fixed or movable position, easily reached by the worn sensor, also being possibly wearable in turn.

The bicycle equipment can be any electromechanical or electric-electronic equipment, such as a derailleur, a suspension, a saddle configuration adjuster, an assisted-pedaling device, a cycle-computer, and similar.

When it is used to control a derailleur, any brake control device mounted on the bicycle handlebars can be substantially simplified needing then to be used only for the actuation of a brake, as opposed to so-called integrated control devices that allow control of both a brake and a derailleur.

In an embodiment, the sensor is a proximity sensor.

In an embodiment, the sensor is a contact sensor.

In the present description and in the attached claims, under "proximity sensor" a sensor capable of detecting the presence of a sensor target in the vicinity thereof, without there necessarily being an actual contact between the two of them, is meant to be indicated; on the other hand, under "contact sensor" a sensor is meant to be indicated capable of detecting the presence of a sensor target only when there is contact between the two of them is meant to be indicated.

The target and the sensor are in particular matched, thereby meaning, in the present description and in the attached claims, that the sensor is configured to switch state when the target respectively enters into and exits from its range, and is configured not to switch state when an object different from a target matched therewith respectively enters into and exits from its range, apart from accidental switching.

Preferably, the control unit is configured to be wearable on a cyclist's finger, so that its movement can also be very precise.

Said sensor and said target are preferably selected from the group consisting of a magnetic sensor and a ferromagnetic target; a capacitive sensor and an electrically conductive target; an optical sensor and a reflective target; an RFID (Radio Frequency Identification) reader or interrogator and a target consisting of a passive RFID tag; preferably being a magnetic sensor and an element made of ferromagnetic material.

The magnetic sensor can be selected from the group consisting of a magnetic Hall sensor, a magnetic Reed sensor, a magnetoresistive sensor.

In a preferred manner, the sensor is a Hall effect magnetic proximity sensor and the target is an element made of ferromagnetic material.

Preferably, the magnetic sensor detects the absence/presence of the magnetic field generated by the target, and thus has a binary digital output.

According to an embodiment, the magnetic sensor is a sensor sensitive only to one magnetic polarity, and the target is so oriented as to face said magnetic polarity towards the magnetic sensor. Also in this case, the sensor preferably has a binary digital output.

Alternatively, the magnetic sensor could be adapted to detect a change in the magnetic field generated by the target, and thus have an analogue or non-binary digital output.

In embodiments, the target is wearable, directly or indirectly, on a finger, preferably on a different finger from a finger on which the control unit is wearable, more preferably on a different finger of the same cyclist's hand.

Preferably, the target consists of or is part of a ring element or split ring element or thimble-type element.

When the target is part of a ring element, it is positioned on or in the ring element or forms an annular sector of the ring element so as to be at the fingertip of a finger on which the ring element is worn, preferably it is worn at a distal phalanx or third phalanx, preferably the fingertip of an index, middle or ring finger.

The target can be incorporated in a ring of flexible and/or elastic material, or alternatively, apart from when it is an RFID tag, it can consist of a ring itself, made of the suitable material indicated above, in particular magnetic rubber.

Moreover, it should be understood that control devices of various sizes can be marketed, for example for children, women and men.

In other embodiments, the target can be incorporated in or consist of a sort of plaster that is disposable or reusable a few times.

In other embodiments, the target is arranged on or is part of at least one component of the bicycle, the component of the bicycle preferably being a handlebar or an appendage or extension of a handlebar (handlebar extension bar) or a frame or a manual control device fixed to the handlebar or to the frame of the bicycle, such as for example a brake control, in particular being a manual actuation member thereof such as a lever, or a support body thereof.

The target can in this case advantageously consist of an insert or a plate or a label or a band or a paint made of the suitable material indicated above.

The target can be removable and/or repositionable, preferably being adhesive.

Advantageously, the target can be a strip of a handlebar-covering band, which can be either magnetic or white or another reflective color or conductive, or an entire handlebar portion so made.

The user can advantageously be left the choice of where to position the target, especially when it is self-adhesive, based on his/her posture, the size of his/her hands and fingers, his/her preferences.

Preferably, the control unit comprises a container, preferably watertight, housing said power source.

Preferably, the control device can include at least one duplicate target, the control unit generating and emitting a command equal to said one of said at least one electrical command in response to a change of state of the sensor brought about by entry of the duplicate target into the detection range of the sensor, and/or in response to a change of state of the sensor brought about by exit of the duplicate target from the detection range of the sensor.

Therefore, an equal command can be caused by the target or by the duplicate target, having the same properties as said target, at the cyclist's discretion. This provision is particularly useful in the case of one or more targets suitably spread over different positions of the bicycle, possibly in addition to the worn target, so that the cyclist can always easily impart the same command irrespective of the posture taken up.

Preferably, the control unit, at least in a worn condition, is shaped like a ring or split ring or thimble.

Preferably, the sensor is positioned on or in the ring or split ring or thimble element, or forms an annular sector thereof, so as to be at the fingertip of a finger on which the ring element is worn, preferably is worn at a distal phalanx or third phalanx. In this way, its position with respect to the target can be easily controlled by the cyclist.

Preferably, the sensor is in a position substantially diametrically opposite to the container, where provided for. In this manner, the control unit can advantageously be worn so that the container, which is heavier, is on the side of the fingernail, and the sensor is at the fingertip.

Preferably, said ring shape is of adjustable size so that the size of the control unit is adaptable to the size of the cyclist's finger. In particular, the control unit can be a ring of adjustable size.

For example, the ring shape of adjustable size can be obtained through a flexible or elastic strap.

Moreover, it should be understood that also with reference to the control unit it is possible to market control devices of various sizes, for example for children, women and men.

Preferably, the proximity sensor is connected to the power source through a flexible printed circuit.

More preferably, the flexible printed circuit is of the stretchable type (Stretchable Printed Circuit Board), so that it is possible to obtain the aforementioned position of the sensor diametrically opposite to the container, where provided for, irrespective of the size of the cyclist's finger.

The ring or split ring, as well as the thimble, is preferably wearable at a distal phalanx or third phalanx, more preferably at the second phalanx of a thumb.

Preferably, the control unit comprises a wireless communication device configured to emit said at least one control signal addressed to, and preferably directly sent to, said bicycle equipment.

With the direct communication between the control device and the bicycle equipment, a very fast response time is advantageously obtained, and the control unit can have particularly limited resources, with consequent advantages in terms of space and costs.

Preferably, the sensor and the communication device are integrated on a printed circuit board.

Preferably, the control unit further comprises an interface for signaling to the cyclist a state of the sensor and/or a change of state thereof and/or an operative condition of the bicycle equipment.

Preferably, the signaling interface is in this case of the luminous type, and more preferably comprises an LED, but can also be of the acoustic type or of another visual type.

An acoustic signal can advantageously be provided by the contact between ferromagnetic target and a ferromagnetic or metallic region of the control unit—which also provide a tactile feedback—or by a beeper or buzzer.

Preferably, the control unit further comprises a processor and/or at least one sensor of operative conditions of the bicycle or of the cyclist or of the road route. In this manner, the control unit can advantageously also be intended for other functions like for example the collection of data and/or sending them to a processor of a device separate from the control device and/or their communication to the cyclist.

In this case, said interface for signaling to the cyclist can be further configured to signal said other information to the cyclist.

In this case, preferably, the luminous signaling interface consists of a screen or display, including a touch screen display also operating as an input interface.

Preferably, the change of state is a change between a deactivation or OFF state corresponding to the state in which the target is outside of the detection range, and a single activation or ON state corresponding to the state in which the target is within the detection range, the activation state being independent from the position of the target within the detection range.

In this way, the implementation of a logic for monitoring the value of an analogue detection variable is advantageously avoided, obtaining quicker responsiveness of the control device and increased immunity against noise, vibrations or external interference.

However, a small hysteresis can be provided for, in order to avoid spurious switching when the target is moving in close proximity to the boundary of the detection range of the sensor, for example due to vibrations. In particular, there can be an electronic feedback circuit (inside or outside the sensor) that, through the setting of two different threshold values, takes a switching distance from ON to OFF different from the switching distance from OFF to ON into account.

Preferably, the change of state is detected substantially independently of a duration of the state in which the target is respectively within or outside of the detection range. In this manner, the implementation of a logic for checking the exceeding of a time threshold is advantageously avoided, obtaining a quick responsiveness of the control device and increased immunity against noise, vibrations or external interference.

In other embodiments, the control unit is configured to measure a duration of the state in which the target is respectively within or outside of the detection range and, in case of a duration longer than a predetermined threshold, generate a second command, preferably a change of operating mode command or a configuration command or, in case the bicycle equipment is a derailleur, a multi-gearshifting command. The second command can be intended for the processor of the control unit, for the bicycle piece of equipment for which the main command is intended, or for a different piece of equipment of the bicycle.

A control device as described above can be intended for the cyclist's right hand, an analogous control device being intended for the cyclist's left hand. In this manner, the cyclist is for example capable of controlling a rear derailleur in the two directions, for example when the right control device emits a control signal of upward gearshifting and the left control device emits a control signal of downward gearshifting; furthermore, a front derailleur having two chainrings can be controlled by receiving the two control signals emitted by the two control devices simultaneously or a time apart shorter than a predetermined threshold.

Furthermore, it may be useful for each control device to emit two or more different control signals. For this purpose, the following embodiments, alternatively or additionally to the embodiment just described of evaluation of the time threshold, are particularly advantageous.

In embodiments, the control device further comprises a second target of the sensor, physically distinct and separate from the control unit and from the target of the sensor, and not electrically connected to the control unit, wherein the sensor is a sensor for detecting also the second target, and the control unit generates and emits a second one of said at least one electrical command in response to the change of state of the sensor brought about by entry of the second target into the detection range of the sensor, and/or in response to a change of state of the sensor brought about by exit of the second target from the detection range of the sensor, the second one of said at least one electrical command being different from said one of said at least one electrical command.

Preferably, the target and the second target are wearable on two distinct fingers of the cyclist, preferably on an index finger and a ring finger when the control unit is wearable on the thumb. Alternatively, the target and the second target are arranged in physically distinct and separate positions of one of the bicycle components listed above, not necessarily on the same one. Alternatively, one of the targets is wearable on a cyclist's finger and the other one is arranged on one of the bicycle components listed above.

There can be plural second targets.

Merely by way of an example, it is possible to use an analogue magnetoresistive sensor, the output of which changes differently depending on whether a target with positive polarity or a target with negative polarity enters into its range, or an RFID reader and two different RFID tags.

In embodiments, the control device further comprises a second sensor having a second detection range, said second sensor being a sensor for detecting the target, and being housed in said control unit or in a second wearable control unit preferably on a second finger of the same cyclist's hand, said second sensor being powered by the power source or by a second power source of the second control unit, wherein the control unit or the second control unit generates and emits another one of said at least one electrical command in response to a change of state of the second sensor brought about by entry of the target into the second detection range, and/or in response to a change of state of the second sensor brought about by exit of the target from the second detection range, said further another one of said at least one electrical command being different from said one of said at least one electrical command.

If the second sensor is housed in the same control unit, the area in its (second) detection range will be at least in part separate from the area in the detection range of said sensor, so that the two commands can be independently generated and emitted through a suitable mutual movement between target and control unit.

Merely as an example, the two sensors could be on opposite sides of the control unit, for example at the nail and at the fingertip or at the side portion of the fingertip.

If the second sensor is housed in a different control unit, the two commands can be independently generated and emitted through a suitable mutual movement between the target and each control unit.

Merely by way of an example, a fixed target on a bicycle component could be approached by two control units worn on two fingers.

There can be plural second sensors, for example a second sensor housed in the control unit and one or two others housed in a second control unit.

In yet other embodiments, the control device comprises both a second target and at least one second sensor as stated above, and in particular further comprises a second sensor having a second detection range, housed in said control unit, and a second target of the sensor, physically distinct and separate from the control unit and not electrically connected to the control unit, wherein the second sensor is a sensor for detecting the second target, and wherein the control unit generates and emits another one of said at least one electrical command in response to a change of state of the second sensor brought about by entry of the second target into the second detection range, and/or in response to a change of state of the second sensor brought about by exit of the second target from the second detection range, said another one of said at least one electrical command being different from said one of said at least one electrical command.

Furthermore, the control device comprising a control unit having a sensor with the respective target can be used paired with another control device also having a sensor with the respective target.

When the two sensors are of the same type and in particular are both magnetic, preferably one responds to a positive polarity and the other one responds to a negative polarity.

It should be noted that the various embodiments can be combined with one another, for example by providing for two sensors in two control units, each one responding both to a first target and to a second target.

Preferably, the power source is a rechargeable cell or battery of cells and the container has a recharging port.

In a second aspect, the invention relates to a bicycle control device, comprising:

a control unit comprising a power source and a switch selected from the group consisting of a mechanical push-button switch, a piezoelectric switch, and a capacitive switch, wherein the control unit generates and emits said at least one electrical command for said equipment in response to a change of state of the switch wherein the control unit is configured to be wearable on a cyclist's finger.

Advantageous features of the control device of the second aspect are those cited with reference to the control device of the first aspect.

Figure 3:
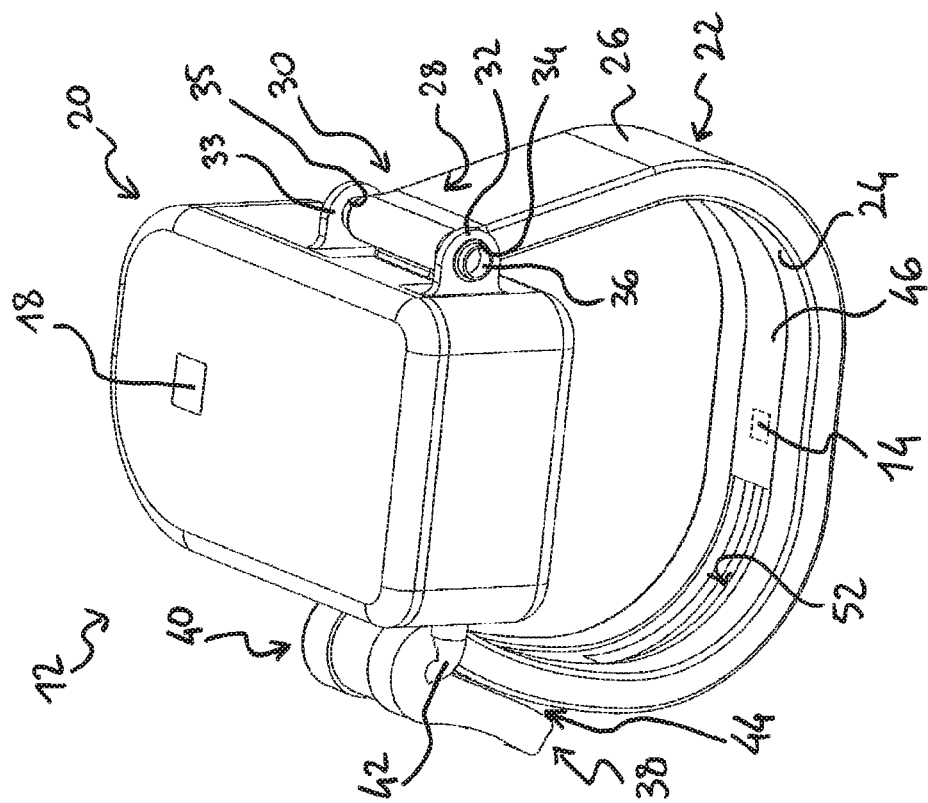
FIG. 3 is a perspective view of a second component of the control device of FIG. 1.
Figure 2:
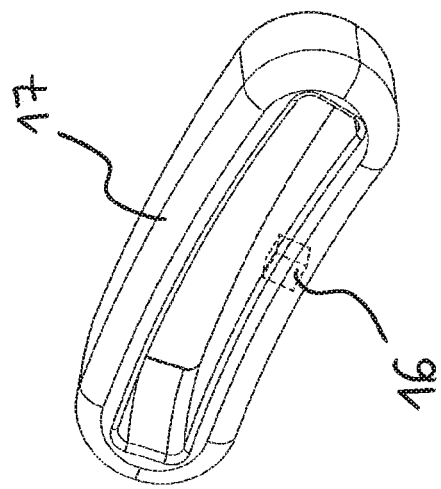
FIG. 2 is a perspective view of an embodiment of a first component of the control device of FIG. 1.

With reference to FIGS. 1-3 a first embodiment of a bicycle control device 10 according to the invention is now described.

The control device 10 first comprises a control unit 12 comprising a sensor 14 (shown with a broken line in FIG. 3) for detecting a target, in particular a proximity sensor. However, it could also be a contact sensor.

The control device 10 further comprises a target 16 of the sensor 14.

The sensor 14 has a detection range, namely it detects the presence of the target 16 as long as the target 16 is within a maximum distance from the sensor 14. In the case of a contact sensor, the maximum distance is zero.

The target 16 is physically distinct and separate from the control unit 12.

In this embodiment, the control unit 12 and the target 16 are each wearable on a respective finger of a cyclist's hand 100. Merely by way of an example, in FIG. 1 the control unit 12 is fitted on the thumb 102 and the target 16 is fitted on the index finger 104 of the cyclist's hand 100.

In FIG. 1, the cyclist has his/her hand closed (in part), with the fingers 102, 104 moved together, and therefore the control device 10 is in a condition or state of proximity—in the specific case also of contact—between the target 16 and the control unit 12. In such a condition or state, the target 16 is at a distance from the sensor 14 within the detection range of the sensor 14 of the control unit 12, briefly the target 16 is within the detection range of the sensor 14. In most proximity sensors, the state of the sensor 14 is an activation or ON state.

When, on the other hand, the cyclist keeps his/her hand open, with the fingers 102, 104 spaced apart, the target 16 is at a distance from the sensor 14 outside of the detection range of the sensor 14 of the control unit 12, briefly the target 16 is outside of the detection range of the sensor 14. In most proximity sensors, the state of the sensor 14 is a deactivation or OFF state.

In response to one of the changes of state of the sensor 14, the control unit 12 generates a control signal, or briefly command, intended for a bicycle equipment, for example a derailleur of a gearshift of the bicycle, and emits it through a communication device better described later on.

The change of state of the sensor 14 that results in the control signal is preferably that brought about by entry of the target 16 into the detection range of the sensor 14, corresponding to the fingers 102, 104 coming together, but alternatively or additionally it could be the change brought about by exit of the target 16 from the detection range of the sensor 14, corresponding to the movement of the fingers 102, 104 apart from each other.

The change of state is, furthermore, preferably but not necessarily the change from the deactivation or OFF state to the activation or ON state mentioned above, but alternatively or additionally it could be the change of state of the sensor 14 from the activation or ON state to the deactivation or OFF state.

Hereinafter, the change of state will be indicated with the expression "when the target 16 enters into/exits from the detection range of the sensor 14", meaning one of the two alternatives or, in some cases, both alternatives. At least in principle, a same command could be actually emitted both upon entry and upon exit of the target 16 into and from the detection range of the sensor 14, or two different commands could be emitted, one upon entry and one upon exit of the target 16 into and from the detection range of the sensor 14.

On the control unit 12, as shown, there is preferably an LED 18, part of an interface for signaling to the cyclist a state of the sensor 14 and/or a change of state thereof and/or an operative condition of the bicycle equipment for which the command emitted when the target 16 enters into/exits from the detection range of the sensor 14 is intended. For example, it is possible to configure the LED 18 to emit a luminous signal upon the emission of the command (with consequent actuation of the equipment controlled by the control device 10).

In greater detail, in the embodiment shown both the control unit 12 and the target 16 are shaped like a ring to be worn at the most distal phalanx of the respective finger, namely the second phalanx of the thumb 102 and the third phalanx of one of the other fingers 102, 104, 106, 108.

The sensor 14 is arranged in the control unit 12 in such a position as to correspond, once the control unit 12 is fitted on the thumb 102, to the fingertip of the thumb 102.

Given the opposability of the thumb, the movement together/apart of the control unit 12 and the target 16 is very simple in the aforementioned condition in which the control unit 12 is fitted on the thumb 102 and the target 16 is fitted on the index finger 104 (FIG. 1), the control device 10 therefore achieving the maximum ease of use.

Furthermore, this condition can offer high reliability of the control device 10 when the command is emitted upon movement together of the sensor 14 and target 16, and when the cyclist grips ergonomic regions of control devices (e.g. brake control devices) possibly provided on the bicycle handlebar, since he/she keeps the thumb 102 distant from the other fingers 104-110 until the command is emitted; undesired actuations, caused by the fingers accidentally coming together, are thus avoided.

Vice-versa, this condition can offer high reliability of the control device 10 when the command is emitted upon movement apart of the sensor 14 and target 16, and when the cyclist grips the handlebar and/or appendages of the handlebar (extension bar, reference numeral 314, 316 in FIG. 14), since the hand is kept closed and therefore the thumb 102 is kept close to the other fingers 104-110 until the command is emitted; undesired actuations, caused by the fingers accidentally moving apart, are thus avoided.

Alternative configurations with respect to the one shown are also possible. For example, by fitting the control unit 12 still on the thumb 102, it is possible to fit the target 16 on the middle finger 106, on the ring finger 108 or on the little finger 110, keeping a good ease of use.

Alternatively, it is possible to fit the target 16 on the thumb 102 and the control unit 12 on one of the remaining four fingers 104-110.

The sensor 14 is preferably a proximity sensor, although as stated above it can be a contact sensor.

The interaction between the target 16 and the sensor 14 in a state in which the target 16 is within the detection range of the sensor 14 can be of the electrical and/or magnetic and/or electromagnetic and/or optical type.

Preferably, the sensor 14 is a magnetic proximity sensor, and the target 16 is an element made of ferromagnetic material.

More preferably, the sensor 14 is a Hall effect magnetic proximity sensor.

When the target 16 made of ferromagnetic material approaches/moves away, the Hall sensor 14 detects, in a per se well known manner, a change in magnetic flux. The change and therefore the response of the sensor is practically immediate; furthermore, this solution has a minimal sensitivity to undesired environmental factors, such as for example dirt and water.

Although the change in magnetic flux is in principle an analogue change, the Hall effect sensor 14 is preferably a digital output sensor. In this manner, the activation ON state of the sensor 14 is advantageously independent from the position of the target 16 within the detection range of the sensor 14. The activation ON state anyway lasts the entire time frame in which the target 16 is within the detection range of the sensor 14, but the control unit 12 generates and emits the control signal only at the leading edge or trailing edge, respectively, of the output signal of the sensor 14.

Alternatively, the sensor 14 can be a magnetic Reed proximity sensor. As known, a Reed sensor is a switch that is closed when the magnetic field generated by the target 16 of ferromagnetic material that entered into the detection range oppositely polarizes two foils, which attract one another and come into contact. This solution also has a minimal sensitivity to undesired environmental factors, and has a binary digital output (ON/OFF).

Alternatively, the sensor 14 can be a magnetic proximity sensor of the magnetoresistive type. As known, this type of sensor is based on the change of resistance of a magnet inside the sensor 14 when the target 16 made of ferromagnetic material enters into the detection range. In this case, the change of resistance is in principle an analogue change, but the magnetoresistive sensor 14 is preferably a binary digital output sensor (ON/OFF).

In the aforementioned cases, the magnetic sensor 14 therefore detects the absence/presence of the magnetic field generated by the target 16, and thus has a binary digital output and/or detects a change of the magnetic field generated by the target 16, and thus has an analogue or non-binary digital output.

It is also possible to use a magnetic sensor 14 sensitive only to a one magnetic polarity, for example a Reed magnet with polarized contacts. In this case, the target 16 must be oriented so as to face said magnetic polarity towards the sensor 14 in the activation condition.

Otherwise it is possible to use an analogue magnetoresistive sensor 14, the output voltage of which changes in two opposite ways depending on the polarity of the target 16 that enters into/exits from its range.

In these cases, the target 16 is preferably in the form of a flat magnet carried by a ring, with the face of proper polarity exposed and the face of opposite polarity facing the finger when the ring is worn, as described better later on with reference to FIG. 2.

Alternatively to a magnetic sensor, the sensor 14 can be a capacitive proximity sensor, the target 16 being electrically conductive. In a per se known manner, when the target 16 enters into/exits from the detection range of the sensor 14, it makes the value of a capacity change, and consequently it causes a switching of state of the sensor 14. Also in this case, the detection is in principle analogue, but the sensor 14 preferably has a binary digital output. This type of sensor is less reliable than magnetic sensors since if its switching threshold is not correctly calibrated, it can be made to switch even by a naked finger brought close to the sensor, or conversely the switching can be prevented if the surface of the sensor 14 or of the target 16 is wet.

Still alternatively, the sensor 14 can be a proximity sensor comprising an RFID reader or interrogator, the target 16 consisting of a passive RFID tag.

Still alternatively, the sensor 14 can be an optical proximity sensor, the target 16 being made of reflective material: in a per se known manner, the light generated by a light source is reflected on a phototransistor or optical switch only when the target 16 is within the detection range of the sensor 14, so that there is a switching of state when the target 16 enter into/exits from the range of the sensor 14. Also in this case, the output signal is advantageously binary digital (ON/OFF). However, such a sensor 14 and target 16 pair is subject to a certain deterioration of the detection in the presence of dirt and water.

The sensor 14 can, alternatively, be an inductive proximity sensor, the target 16 being made of ferromagnetic material. With respect to the use of magnetic sensors, in this case the control unit 12 is however bulkier and more complex from the circuit point of view since it has to contain an electromagnet; the power consumption is also high. The movement of the target 16 made of ferromagnetic material towards/away from the inductive proximity sensor 14 causes a change of reluctance of the electromagnet, which causes the switching of state of the sensor 14.

Still alternatively, the sensor 14 could be configured like a contact sensor formed from an open circuit, the target 16 being electrically conductive and configured to close said open circuit when brought into contact with its two ends. For example, the target 16 can consist of a small conductive plate, and the control unit 12 can comprise two exposed contacts, gold-coated to prevent oxidation thereof: by resting the target 16 on the contacts, these are short-circuited.

In each of the cases listed above, apart from the case of the open circuit, reference has been made to a proximity sensor since contact between sensor 14 and target 16 is not required to cause the switching. Those skilled in the art will, however, understand that such sensors and respective targets can also be brought so close as to enter in contact with each other.

The target 16 can consist, as shown in FIG. 1, of a ring element that can be fitted on a cyclist's finger 102-110, in particular on the index finger 104.

For example, in the case of interaction between the target 16 and the sensor 14 of the magnetic and/or electromagnetic type, the target 16 can consist of a ring completely made of a ferromagnetic material, preferably magnetic rubber; in the case of interaction between the target 16 and the sensor 14 of the electric type, the target 16 can consist of a ring completely made of electrically conductive material; in the case of interaction between the target 16 and the sensor 14 of the optical type, the target 16 can consist of a ring completely made of light-reflecting material; etc.

Preferably, the ring-type target 16 is made of a fairly flexible material and/or in a configuration that gives it adequate elasticity and dimensional adaptability—wherein control devices in which the ring-type target 16 is of various sizes, for example for children, women and men can in any case be marketed.

Alternatively, the ferromagnetic, conductive, reflective or RFID target 16 could be a non-annular element, as indicated in FIG. 2, and be incorporated or supported by an annular support structure 17 of suitable shape and material.

Still alternatively, the target 16 wearable on a finger can be formed from or carried by a split ring or by a thimble.

In the specific embodiment, as shown in particular in FIG. 3, the preferred ring shape of the control unit 12 is determined by a container 20 and a flexible strap 22 that in the mounted condition extends from one side of the container 20 to the other, wrapping around the cyclist's finger.

The ring formed by the container 20 and by the strap 22 is of adjustable size, through adaptation of the used size of the strap 22 as described hereinafter, so that the control unit 12 is adaptable to fingers 102-110 (FIG. 1) of different sizes—wherein control devices in which the control unit 12 is of various sizes, for example for children, women and men can in any case be marketed.

The aforementioned sensor 14 is carried by the strap 22, while the rest of the electric/electronic components of the control device 10 are housed inside the container 20.

The strap 22 comprises an inner face 24, which in use of the control device 10 is in contact with the finger 102-110 on which the control unit 12 is fitted, and an outer face 26.

With reference also to FIG. 4, the strap 22 comprises a first end 28 pivotally constrained to the container 20 at a pivot seat 30 so as to be able to rotate, even if partially, with respect to the container 20.

By way of an example, the pivot seat 30 on the container 20 comprises opposite flanges 32, 33 provided with holes 34, 35, and at the first end 28 of the strap 22 a slot is formed extending in the transversal direction of the strap 22, adapted to receive a pin 36 that inserts into the holes 34, 35 of the flanges 32, 33.

The strap 22 comprises a second end or free end 38, which can be releasably fixed to the container 20, in particular at a fixing seat 40.

The fixing seat 40 is made on an opposite side of the container 20 with respect to the pivot seat 30, and is in particular configured like a loop 42. The two seats 30, 40 are aligned in the transversal direction of the strap 22.

On the outer face 26, the strap 22 comprises a releasable fixing area 44 extending for a length Lf from its free end 38. The releasable fixing area 44 comprises matching releasable fixing means, namely adapted to make a stable, but releasable mechanical connection. For example, the releasable fixing area 44 can comprise two areas 44a, 44b of a fabric respectively having hooks and loops (Velcro™), the fixing of which takes place by pressure and can be released by forcing them apart.

As will be clear, the fixing of the strap 22 to the fixing seat 40 takes place by inserting the free end 38 into the loop 42, making it slide until it forms a loop of the strap 22 of the desired size, and folding the releasable fixing area 44 onto itself so as to couple the matching releasable fixing means to one another.

The areas 44a and 44b are exemplarily shown of equal length Lf/2, but they can have a different length; preferably, furthermore, the length Lf is selected so as to provide a suitable range of ring sizes, still leaving the area of possible positioning of the sensor 14 free.

Figure 6:
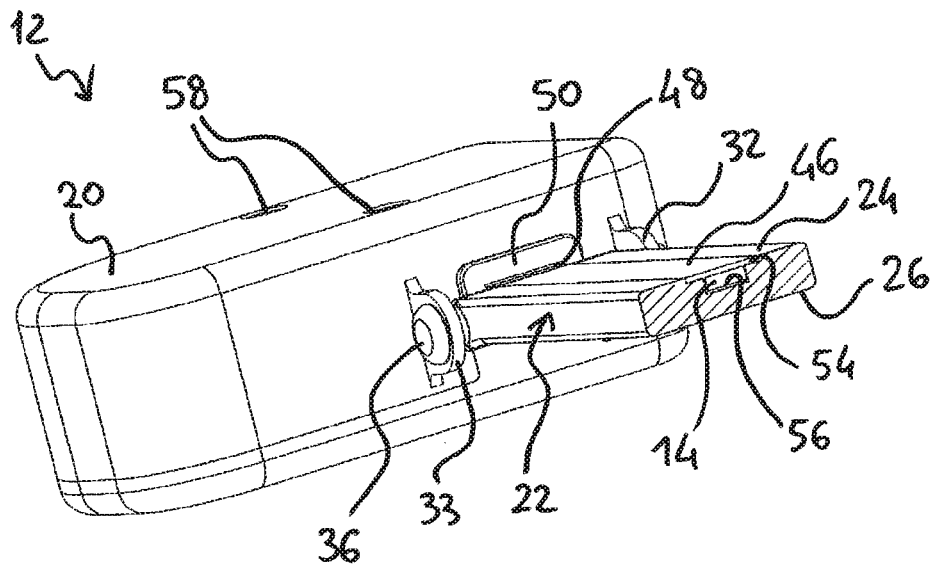
FIG. 6 is a perspective sectional view of the component shown in FIG. 3.
Figure 7:
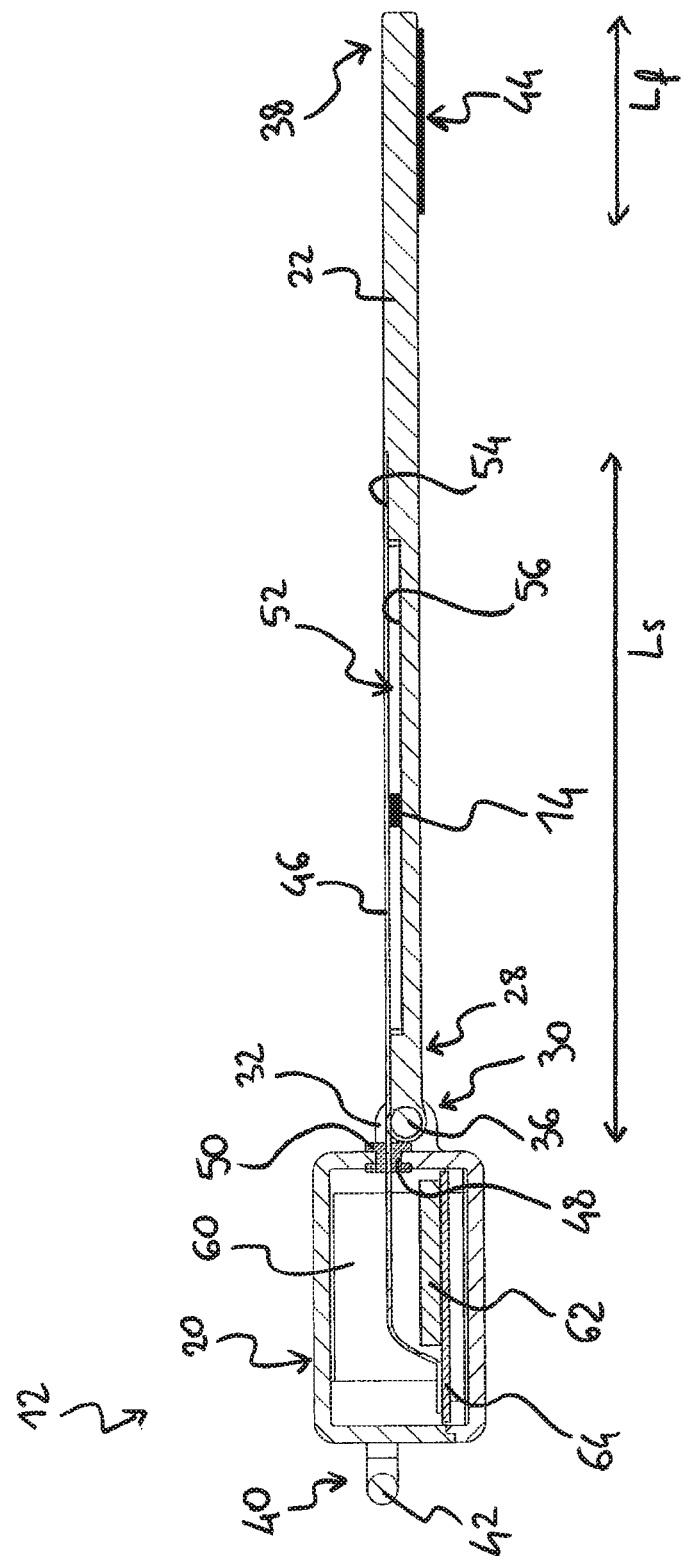
FIG. 7 is a side sectional view of the component shown in FIG. 3.

With reference also to FIGS. 5-7, how the sensor 14 is carried by the strap 22 and connected to the rest of the electric/electronic components of the control device 10 housed inside the container 20 is better described.

The sensor 14 is connected to the components inside the container 20 preferably through a flexible printed circuit 46. Such a flexible printed circuit 46 connects the sensor 14 to a power source—described hereinafter—that powers it, internal to the container 20; the flexible printed circuit 46 further carries a state signal from the sensor 14 to the aforementioned components inside the container 20 for the generation and emission of the control signal intended for the bicycle equipment.

In order to allow, irrespective of the size of the finger 102-110 on which the control unit 12 is applied, the sensor 14 to be in the desired position in use of the device 10, wherein the sensor 14 is in a position substantially diametrically opposite the container 20, the flexible printed circuit 46 is preferably of the stretchable type. For example, it can be the stretchable flexible circuit marketed by Panasonic Corporation, Osaka, Japan under the name flexible circuit board materials (resin coated copper foils) "FELIOS FRCC™".

The flexible printed circuit 46 comes out from the container 20 at a slit 48, tightly closed by a gasket 50 that prevents the entry of water and/or dirt inside the container 20, housing the electronics.

The flexible printed circuit 46 is preferably inserted in a suitable groove 52 made on the inner face 24 of the strap 22. The groove 52 has, for almost its entire length Ls from the first end 28 of the strap 22, a T-shaped cross section. The widest region 54 of the groove 52, corresponding to the head of the T, is sized to house the flexible printed circuit 46; the narrower region 56 of the groove 52, corresponding to the leg of the T, is sized to receive the sensor 14, which is fixed to and projects from the face of the flexible printed circuit 46 facing towards the strap 22.

In FIG. 5, the stretchable flexible printed circuit 46 is not shown at its maximum stretching, so that the sensor 14 is spaced from the end of the groove 52; it should be understood that the stretchable flexible printed circuit 46 can be less or more stretched, until the sensor 14 is brought to the end of the groove 52, depending on the size of the finger 102-110 of the cyclist.

As already stated, furthermore, the length Ls of the groove 52 is preferably selected so that the flexible printed circuit 46, and particularly the sensor 14 fixed thereto, are not in the strap portion 22 comprising, on its outer face 26, the releasable fixing area 44.

In FIGS. 5-6 two contacts 58 of a recharging port can also be seen, for recharging a power source 60 with which the control unit 12 is provided, when it is in the form of one or more rechargeable cells. The power source 60 is also called battery power supply unit 60 herein.

In FIG. 7, the control unit 12 is shown in section in the longitudinal direction of the strap 22. Inside the container 20, the power source 60, an antenna 62 part of a wireless transmission device, and a printed circuit board or PCB 64 carrying the various electric/electronic components intended for the management of the control unit 12 itself can be seen.

In particular, the PCB 64 carries components for managing the output signal of the sensor 14, the signaling interface comprising the LEDs 18, the wireless transmission device comprising the antenna 62, and the power source 60, for example for managing recharging thereof and for checking the residual charge.

In particular, the PCB 64 preferably further carries a processor and/or at least one sensor of operating conditions of the bicycle or of the cyclist or of the road route.

Figure 8:
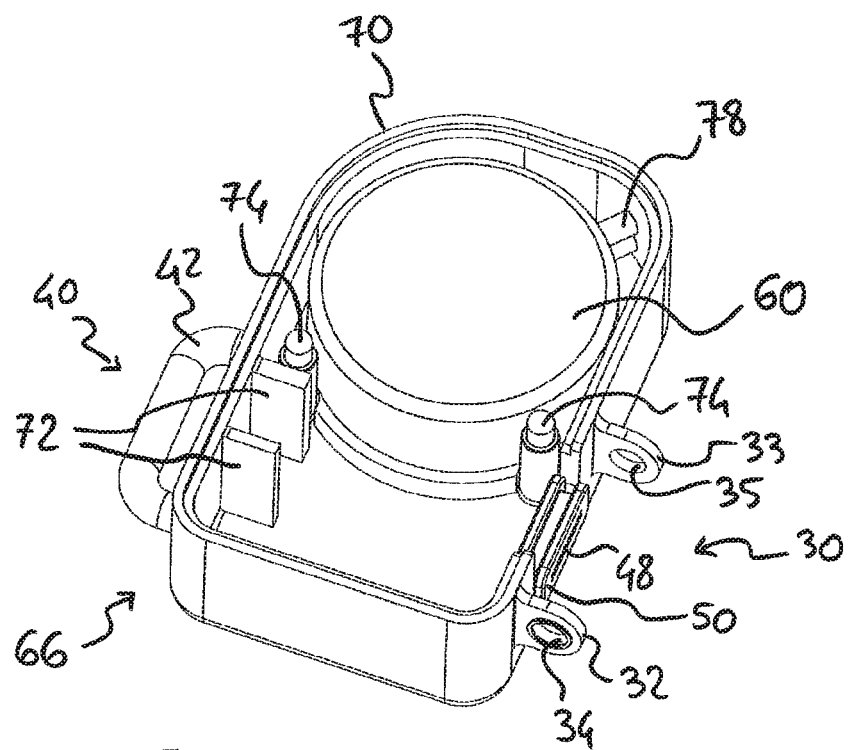
FIGS. 8-10 are perspective views of some parts of the component shown in FIG. 3.
Figure 9:
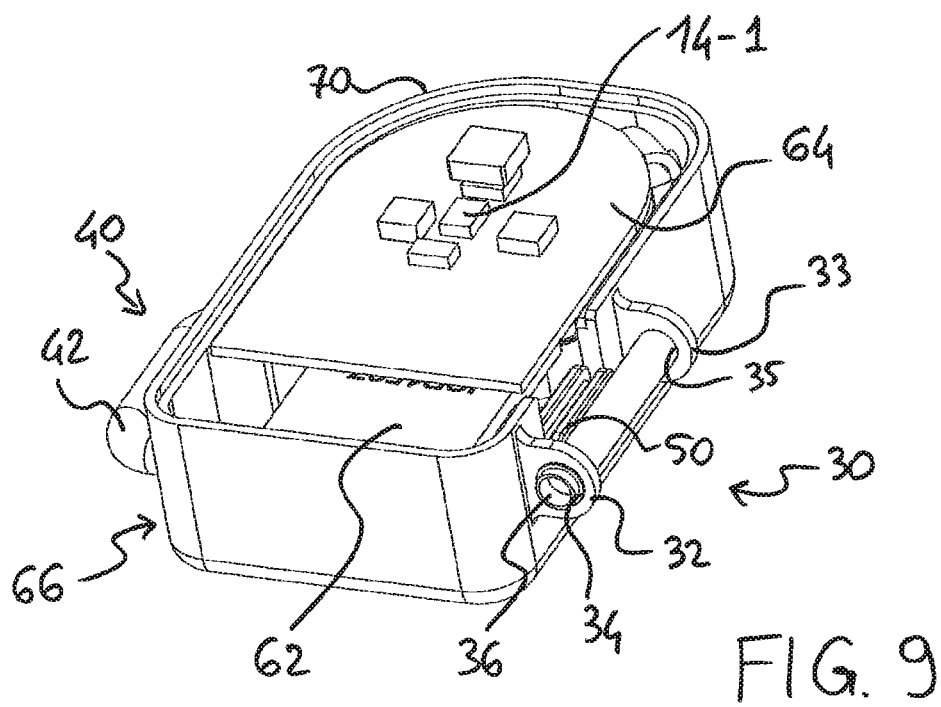
Figure 10:
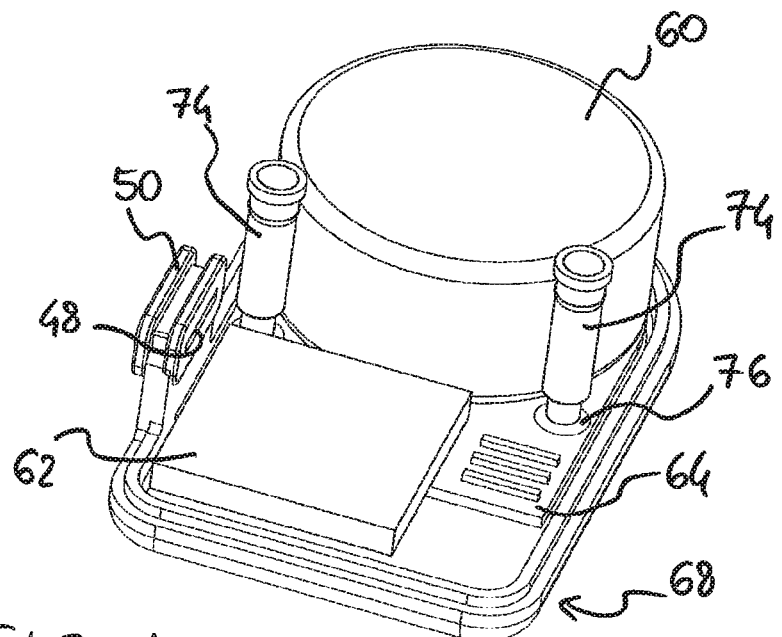

With reference also to FIGS. 8-10, wherein some components are shown in more than one figure, the container 20 comprises a base 66 closed by a cover 68.

The battery power supply unit 60 is housed in a region of the base 66 (FIG. 8). In particular, the battery power supply unit 60 is a button cell. The side wall of the base 66 has a region 70 having substantially the same curvature as the battery power supply unit 60.

From the bottom of the base 66 some spacers 72 rise up, on which the PCB 64 rests, which is shown in FIG. 10 adjacent to the cover 68 to which it is fixed.

The antenna 62 is fixed on the side of the PCB 64 facing towards the base 66 in a position partially offset with respect to that of the PCB 64, in order to minimize the screening of the signal of the antenna 62 by the non-conductive material of the support of the PCB 64.

From the bottom of the base 66 electrical contacts 74 also rise up, preferably of the spring type—so-called "pogo-pins"—i.e. having two telescopic portions urged apart by an inner spring. One end of the electrical contacts 74 contacts pads 76 of the PCB 64. The opposite ends of the electrical contacts 74 surface from the other side of the container 20, and constitute the aforementioned contacts 58 of the recharging port. The pads 76 of the PCB 64 are suitably brought into contact with contacts blades 78 of the cells 60 (FIG. 8).

The cover 68, when applied to the base 66, preferably makes a watertight closure, such as to protect the electric/electronic components against possible entry of water and/or dirt. A suitable gasket (not shown) can, for such a purpose, be arranged between the cover 68 and an upper edge of the base 66.

The cover 68 is preferably irremovably fixed to the base 66, whereby under "irremovably", in the present description and in the attached claims, it is meant to indicate that during use the container 20 should remain always closed, opening thereof being only provided for in order to carry out repairs and/or replacements on the components thereinside. The cover 68 is for example fixed to the base 66 through gluing, but alternatively it is possible to provide for a cover 68 fixed through force-fitting, welding, etc. However, in case of a replaceable battery, the cover 68 can be fixed to the base 66 in an openable manner, for example through screwing.

The container 20 shall give the electronic components housed thereinside suitable protection, besides against water and/or dirt as stated above, also from possible mechanical stresses due for example to impacts. It is therefore made of a preferably impermeable and rigid material, but this is not strictly necessary if for example the inner components are provided with suitable additional impermeable protection and/or protection against mechanical stresses.

Figure 11:
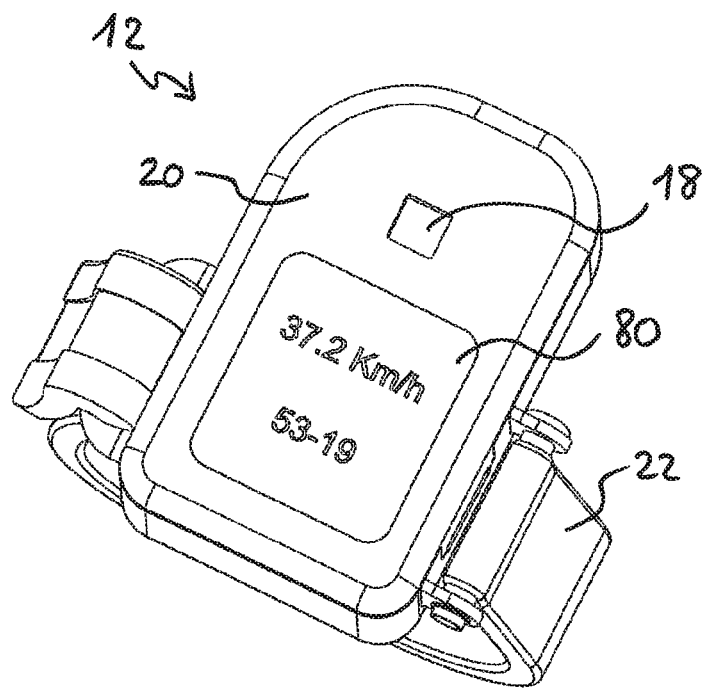
FIGS. 11 and 12 are perspective views of further embodiments of the second component of the control device of FIG. 1.

FIG. 11 shows a second embodiment of the control unit 12, which differs from the previous one in that it comprises a more complex signaling interface. Such a signaling interface comprises, besides the LED 18, a screen or display 80.

LED 18 can still have, for example, the function of signaling the state of the sensor 14 and/or its change of state and/or the emission of the command and/or an operating condition of the bicycle equipment.

The screen or display 80 can be provided for in order to display more detailed information concerning the state of the control device 10 and/or of the bicycle equipment controlled thereby, as well as of other bicycle components, or to display warning messages. Furthermore, the screen or display 80 can be used to display information obtained from other sensors suitably spread over the bicycle or in the control unit 12 itself; it is for example possible to display the bicycle speed, detected by a suitable speed sensor.

Figure 12:
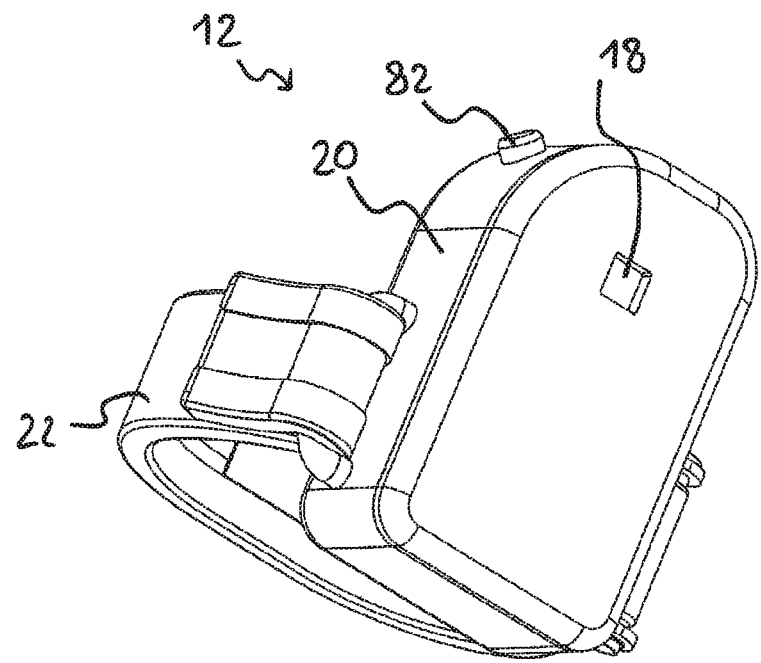

FIG. 12 shows a third embodiment of the control unit 12, which differs from that of FIG. 1 in that it comprises a mechanical pushbutton switch 82. The mechanical pushbutton switch 82 can for example have a mode selection function (mode button). Alternatively, a piezoelectric switch or a capacitive switch can be provided for. Such switches can be actuated by the same cyclist's finger, not being matched with any specific target.

In an alternative embodiment (not shown) the strap 22 can be replaced by a semi-rigid split ring. The semi-rigid split ring can for example be fixed at a first end to a first side of the container 20, and have the other end free, not connected to the container 20, so as to give the desired partial adaptability—due to minimum levels of deformability of the constituting material—of the semi-rigid ring during positioning on the cyclist's finger. Still alternatively, it is possible to provide for a closed semi-rigid or rigid ring, in such as case the semi-rigid ring having to be specifically sized to adapt to the fingers of the specific cyclist. Still alternatively, a thimble shape for the control unit 12$t$ may provided.

Analogous shapes can be provided for the target 16. Furthermore, the target 16 can be incorporated into or constitute a sort of plaster that is disposable or can be reused a few times.

The target 16 does not, however, necessarily have to be configured like an element wearable by the cyclist, rather it can be fixed onto the bicycle.

Figure 13:
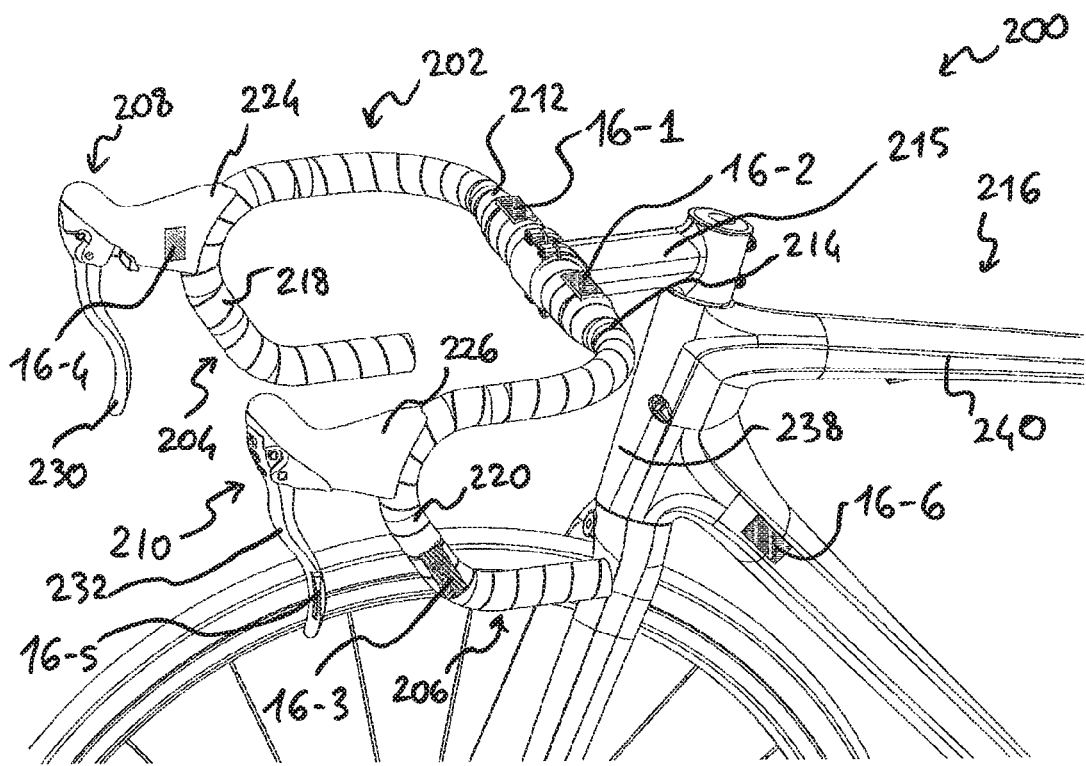
FIGS. 13 and 14 are perspective views of further embodiments of the first component of the control device of FIG. 1, on a bicycle.

FIG. 13 shows, only by way of an example, several possible positions of the target 16, which is respectively indicated as target 16-1, 16-2, 16-3, 16-4, 16-5, 16-6, on bicycle 200.

The bicycle 200 shown is in particular provided with a handlebar 202 of the drop-bar type, comprising curved ends 204, 206 on which manual control devices 208, 210, intended for example for the actuation of the brakes, can be fixed.

Totally by way of an example, the target 16 can be positioned on the handlebar 202, preferably on substantially rectilinear portions 212, 214 of the handlebar 202 each extending from a tube 215 for coupling the handlebar 202 on the frame 216 (target 16-1, 16-2), in particular on an upper face thereof; or on the descending portion 218, 220 of each curved end 204, 206 of the handlebar 202, in particular on a distal face thereof (target 16-3, visible only on the left side of the handlebar).

Furthermore, the target 16 can be positioned on one of the manual control devices 208, 210 intended for example for controlling the brakes, preferably on a support body thereof 224, 226 (target 16-4, visible only on the right manual device 208), in particular on an inner face thereof, or on a manual actuation member thereof 230, 232 (target 16-5)—in this case a lever —, in particular on an outer face thereof.

Furthermore, it is possible to position the target 16 on the frame 216 (target 16-6), for example on the down tube 236, for example close to its connection with the fork tube 238 and the horizontal tube 240 of the frame 216.

FIG. 14 also shows, again only by way of an example, several possible positions of the target 16, indicated herein as target 16-7, 16-8, when not wearable, and configured instead for fixing on the bicycle 300.

In this case, the bicycle 300 is provided with a so-called time trial handlebar 302, comprising a "bull horn-shaped" main body 304, at the ends 306, 308 of which manual control devices 310, 312 can be fixed, intended for example for the actuation of the bicycle brakes. This particular type of handlebar 302 further comprises extensions or appendages (so-called "extension bars") 314, 316, which extend from the main body 304 of the handlebar 302 in travel direction. On the extensions 314, 316 there are also ergonomic supports 318, 320 for the cyclist to rest his/her elbows on when gripping the ends of the extensions 314, 316, in a particularly aerodynamic posture with arms tucked in. There could also be manual control devices (not shown) at the free ends of the extensions 314, 316, so-called "bar-end control devices".

In the case of such a handlebar 302, the target 16 can for example be positioned on the ends 306, 308 of the main body 304 of the handlebar 302, in particular on the proximal face (target 16-7, visible on the right side).

Alternatively, the target 16 can be positioned at the handgrips 324, 326 of the extensions 314, 316, in particular on their proximal face (target 16-8, visible on the right side).

Also with this type of handlebar, the target 16 could be positioned on the frame of bicycle 300.

Figure 14:
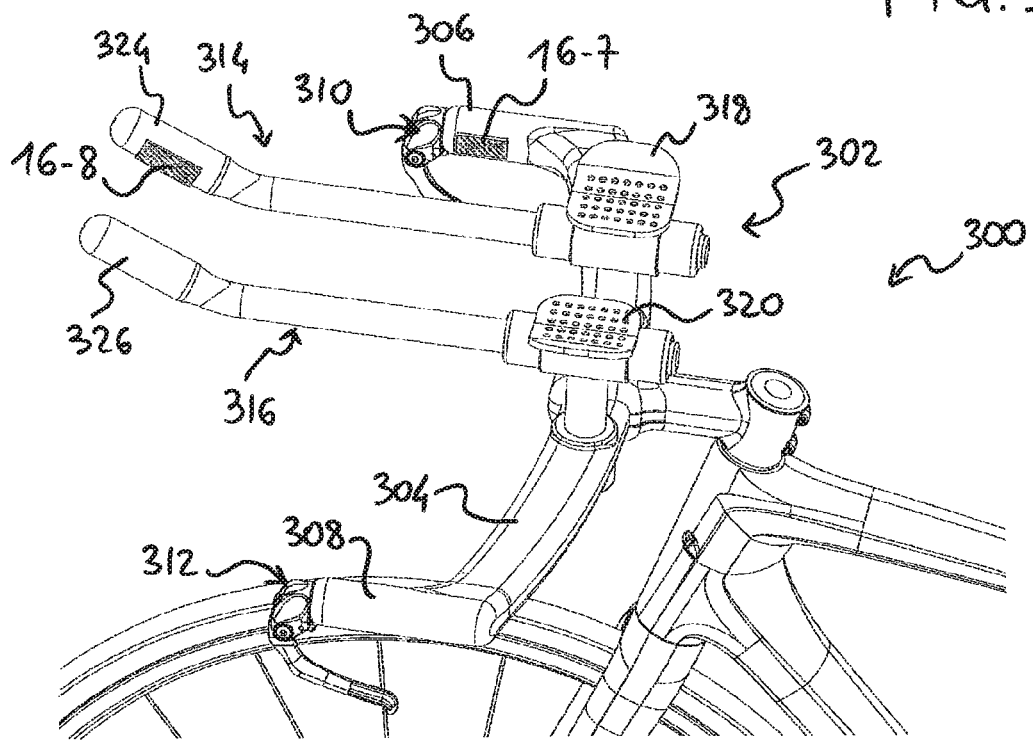

As discussed in the introductory part, in the cases shown in FIGS. 13 and 14, the target 16 can advantageously consist of an insert or a plate or a label or a band or a paint made of suitable material, depending on the type of sensor 14 that has to detect it.

The target 16 can be removable and/or repositionable, preferably being adhesive.

Advantageously, the target 16 can be a strip of magnetic handlebar-covering band for a magnetic sensor 14, or white or another reflective color for an optical sensor 14, or conductive for a capacitive or contact sensor 14, or it can be an entire handlebars portion so made.

The user can advantageously be left the choice of where to position the target 16, especially when it is self-adhesive, based on his/her posture, the size of his/her hands and fingers, on his/her preferences.

Furthermore, depending on the position selected for the target 16, the sensor 14 can emit the control signal when the target 16 enters into the detection range of the sensor 14 or when the target 16 exits from the detection range of the sensor 14, also based on where the control unit 12 is worn, in particular based on the finger 102-110 on which the control unit 12 is positioned.

Advantageously, on a same bicycle more than one target 16 may be provided for, for example a target 16 in each one of positions 16-1, . . . 16-8 shown in FIGS. 13 and 14.

The control device 10 can therefore comprise more than one target 16-1, . . . 16-8 arranged on or part of a bicycle component, alternatively or additionally to one or more wearable targets 16, for example of the type shown in FIGS. 1 and 2. Only by way of an example, FIG. 15 better described hereinafter shows a control device 10 comprising a pair of wearable targets 16 (target 16 and target 16-9).

Control device 10 can, alternatively or additionally, comprise more than one wearable control unit 12, for example of the type shown in FIGS. 1 and 3. Only by way of an example, FIG. 16 better described hereinafter shows a control device 10 comprising a pair of wearable control units 12 (indicated as control unit 12 and control unit 12-1), each comprising a respective sensor indicated as sensor 14 and sensor 14-1.

FIGS. 17-23 illustrate some block diagrams representative of several possible embodiments of a manual control device, and of the respective operation, discussed hereinafter.

Figure 17:
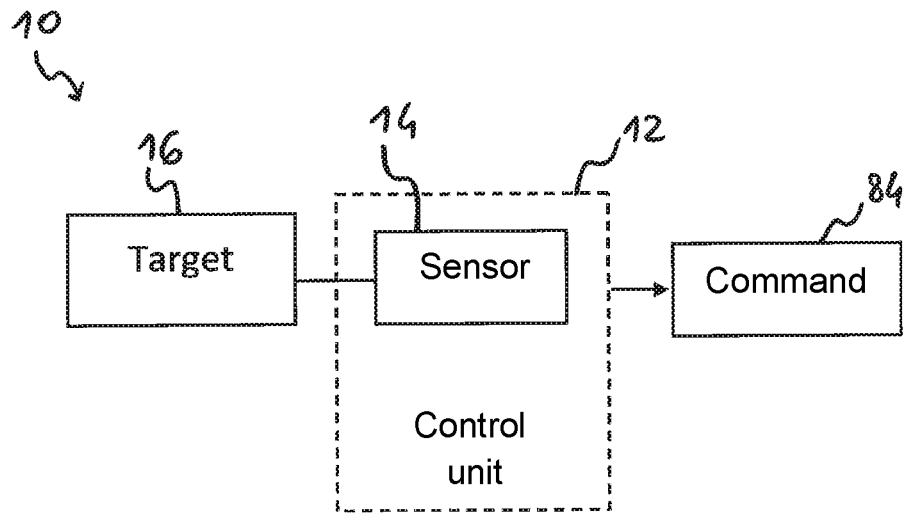
FIGS. 17-23 show some block diagrams representative of different possible embodiments of a manual control device of the invention, and of the respective operation followed thereby.

FIG. 17 shows the basic configuration, wherein the control device 10 comprises a target 16, and a control unit 12—comprising a sensor 14—which emits a command 84 upon a change of state of the sensor 14 brought about by entry of the target 16 in the detection range of the sensor 14, and/or upon a change of state of the sensor 14 brought about by exit of the target 16 from the detection range of the sensor 14.

The control device shown in FIG. 1, in which there is a control unit 12 worn on the thumb 102 and a single target 16 worn on the index finger 104, is for example representative of the configuration of FIG. 17.

Figure 18:
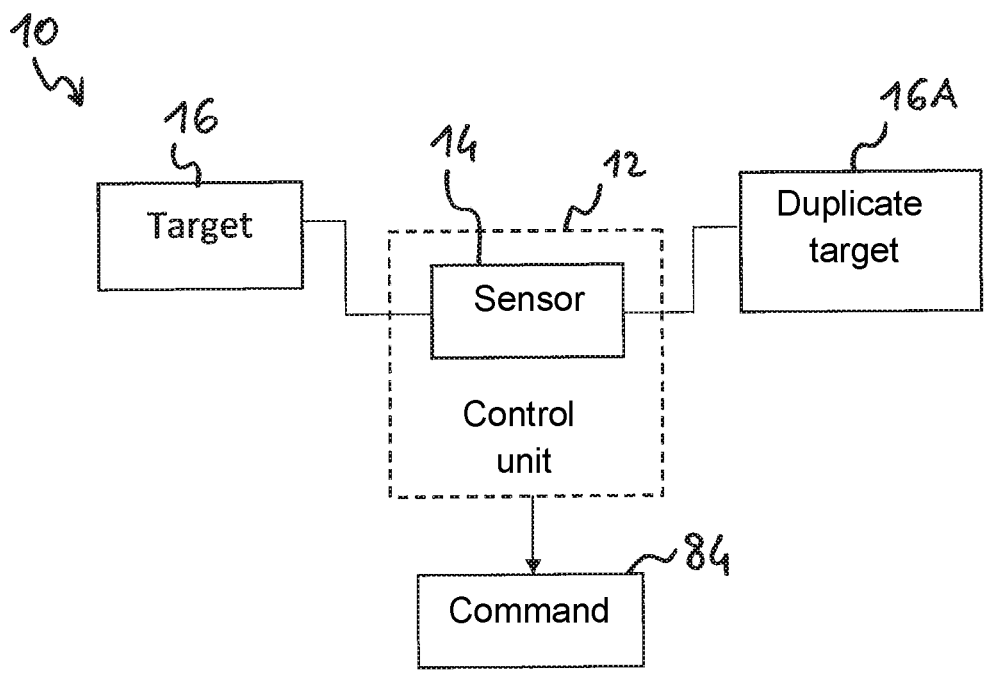

When there is (at least) one second target, it can act as a duplicate target 16A, as schematized in the embodiment of FIG. 18: the control unit 12 in this case generates and emits a first command 84 in response to one of the changes of state of the sensor 14 when the main target 16 enters into/exits from the detection range of the sensor 14, and emits a second command equal to the first command, namely a same command 84 (for example an upward gearshifting command) in response to one of the changes of state of the sensor 14 when the duplicate target 16A enters into/exits from the detection range of the sensor 14. As stated, if the target 16 is worn on the finger, the duplicate target 16A can for example be anyone of targets 16-1, . . . 16-8 of FIGS. 13-14 (or more than one of them). When in the control device 10 there is at least one second target, it does not necessarily have to act as a duplicate target, conversely it can allow the control device 10 to emit two different commands, in particular in case a second sensor is also provided for, as schematized in the embodiments of FIGS. 19 and 20.

Figure 19:
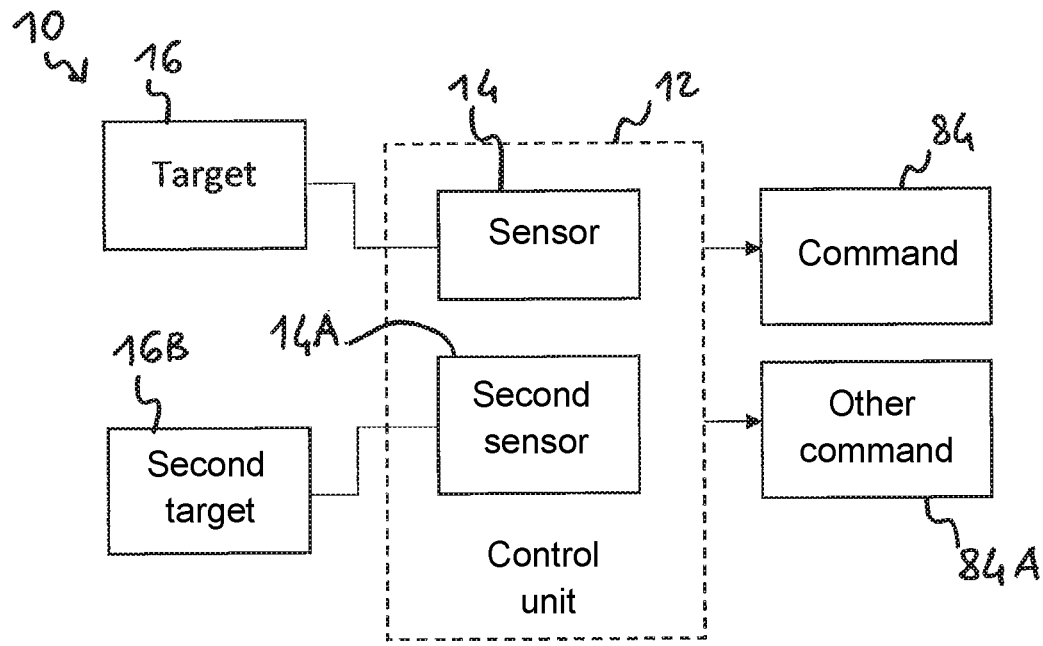
Figure 20:
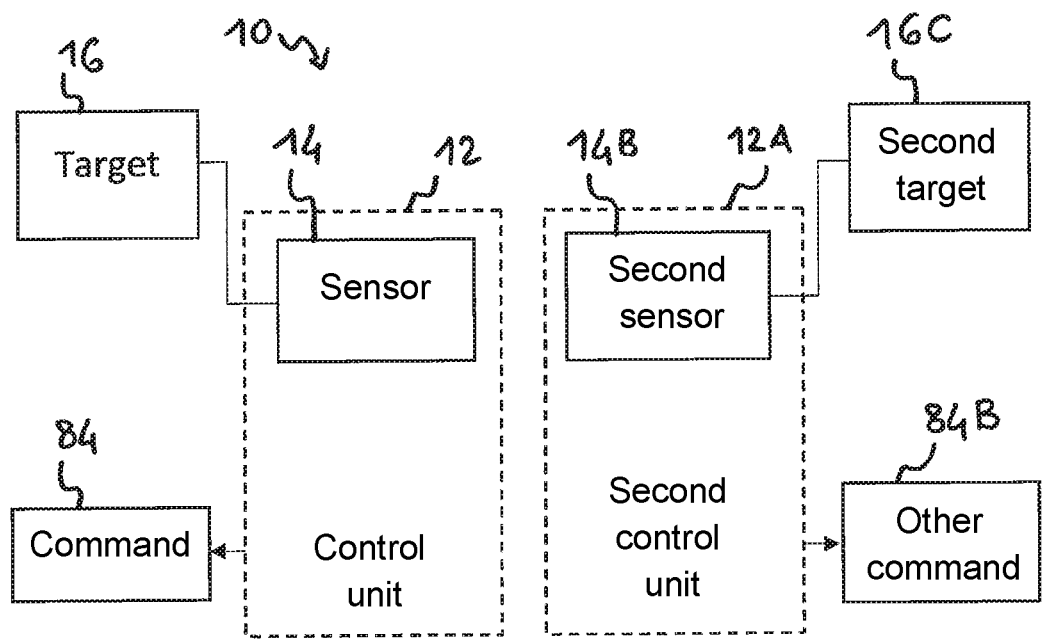

Like in the embodiment of FIG. 19, the second sensor 14A can be housed in the same control unit 12 in which the first sensor 14 is housed, or, like in the embodiment of FIG. 20, the second sensor 14B can be housed in a second control unit 12A, the second control unit 12A being wearable preferably on a second finger 102-110 of the same cyclist's hand.

Therefore, there will be two matched sensor/target pairs (sensor 14/target 16 and sensor 14A/target 16B in FIG. 19; sensor 14/target 16 and sensor 14B/target 16C in FIG. 20), each sensor emitting a respective command (for example one sensor emits an upward gearshifting command and the other sensor emits a downward gearshifting command) when the respective target enters into/exits from its detection range: in FIG. 19, the control unit 12 emits command 84 when target 16 enters into/exits from the detection range of sensor 14, and emits command 84A when target 16B enters into/exits from the detection range of sensor 14A; in FIG. 20, the control unit 12 emits command 84 when target 16 enters into/exits from the detection range of sensor 14; the control unit 12A emits command 84B when target 16C enters into/exits from the detection range of sensor 14B.

Figure 15:
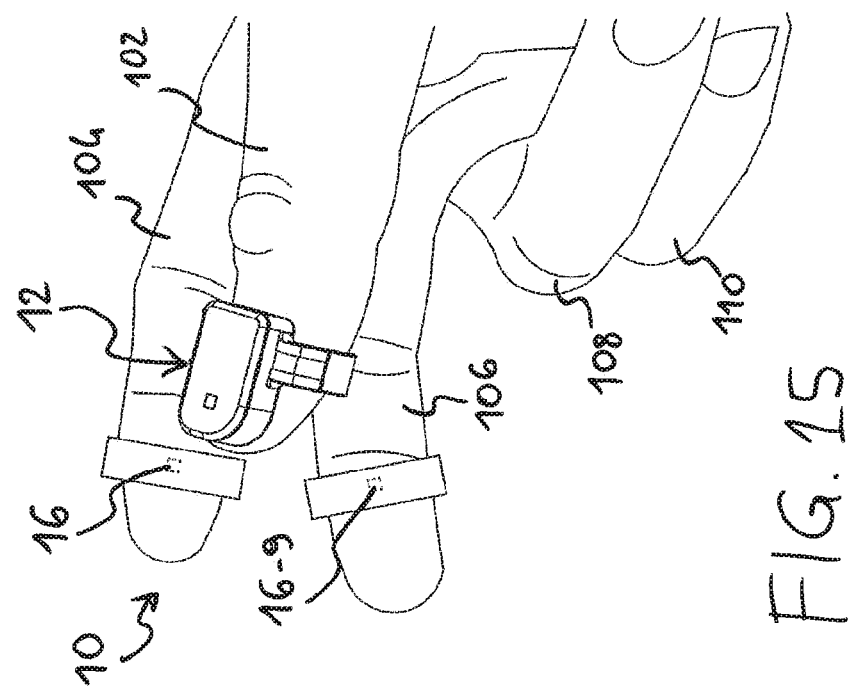
FIG. 15 shows a bicycle control device according to a second embodiment of the invention, worn on a hand.

The control device shown in FIG. 15, showing the two targets 16 and 16-9, can advantageously correspond to the configuration of FIG. 19 if the control unit 12 worn on the thumb 102 comprises two sensors, each one univocally matched with one of the targets. For example, it is possible to use sensors of a different type, for example a magnetic sensor with ferromagnetic target and an optical sensor with reflective target, or two magnetic sensors each responding to a different polarity.

Furthermore, for the emission of two different commands, the control device 10 can include a second sensor, but both sensors 14 can be matched with the same target 16 (and possibly with a duplicate target of target 16).

Figure 21:
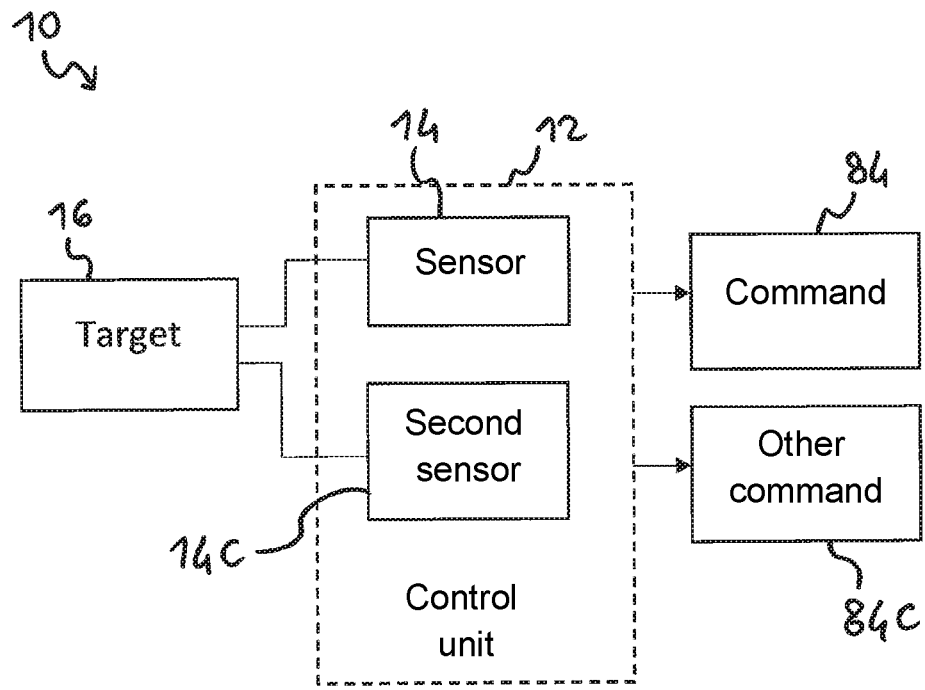
Figure 22:
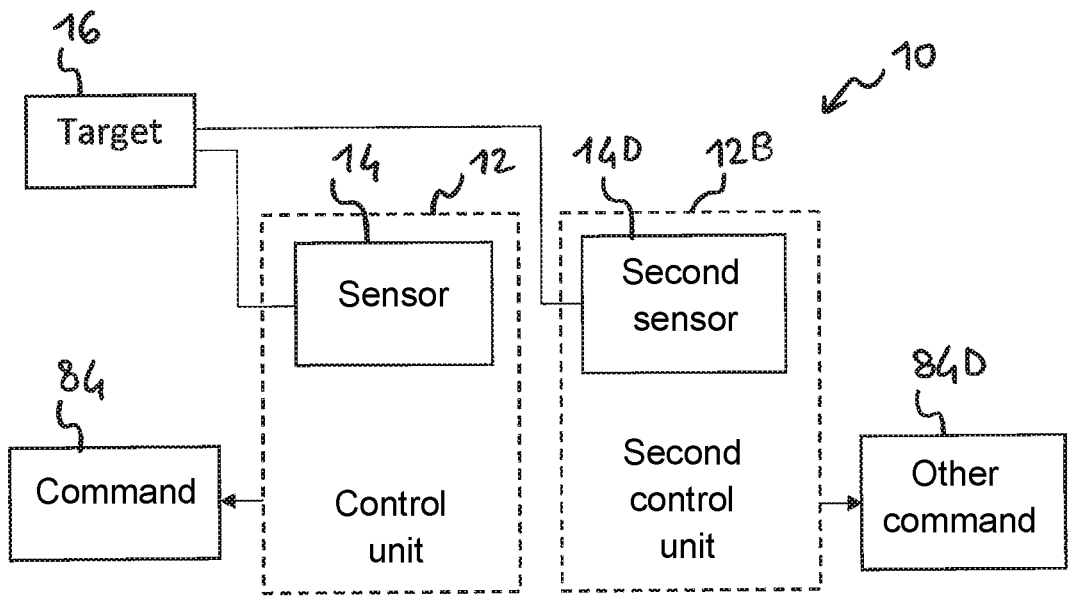

Like in the embodiment of FIG. 21, the second sensor 14C can be housed in the same control unit 12 in which the first sensor 14 is housed, or, like in the embodiment of FIG. 22, the second sensor 14D can be housed in a second control unit 12B, the second control unit 12A being wearable preferably on a second finger 102-110 of the same cyclist's hand.

In FIG. 21, the control unit 12 emits command 84 when target 16 enters into/exits from the detection range of sensor 14, and emits command 84C when target 16 enters into/exits from the detection range of the sensor 14C; in FIG. 22, the control unit 12 emits command 84 when target 16 enters into/exits from the detection range of the sensor 14, and the control unit 12B emits command 84D when target 16 enters into/exits from the detection range of sensor 14D.

Figure 16:
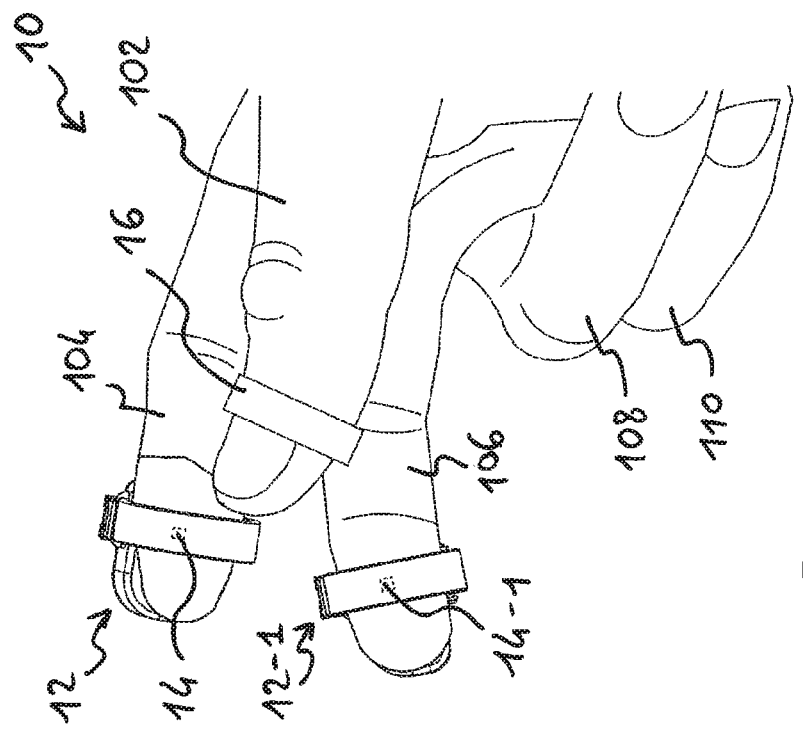
FIG. 16 shows a bicycle control device according to a third embodiment of the invention, worn on a hand.

The control device shown in FIG. 16, in which there is a control unit 12 worn on the index finger 104 and a second control unit 12-1 worn on the middle finger 106, and a single target 16 worn on the thumb 102, can advantageously correspond to the configuration of FIG. 22.

The control device shown in FIG. 1, in which there is a control unit 12 worn on the thumb 102 and a single target 16 worn on the index finger 104, can be representative of the configuration of FIG. 21 if, besides the sensor arranged at the fingertip of the thumb 102 (sensor 14 shown in FIG. 3), another sensor of the same type, but arranged for example in the container 20, so as to be on the nail of the thumb 102 (cf. sensor 14-1 in FIG. 9), is provided for. In this case it is possible to ensure that the area within the detection range of the sensor on the nail is at least in part separate from the area within the detection range of the sensor on the fingertip, so that the two commands can be independently generated and emitted by suitably bringing together index finger 104 and thumb 102.

Figure 23:
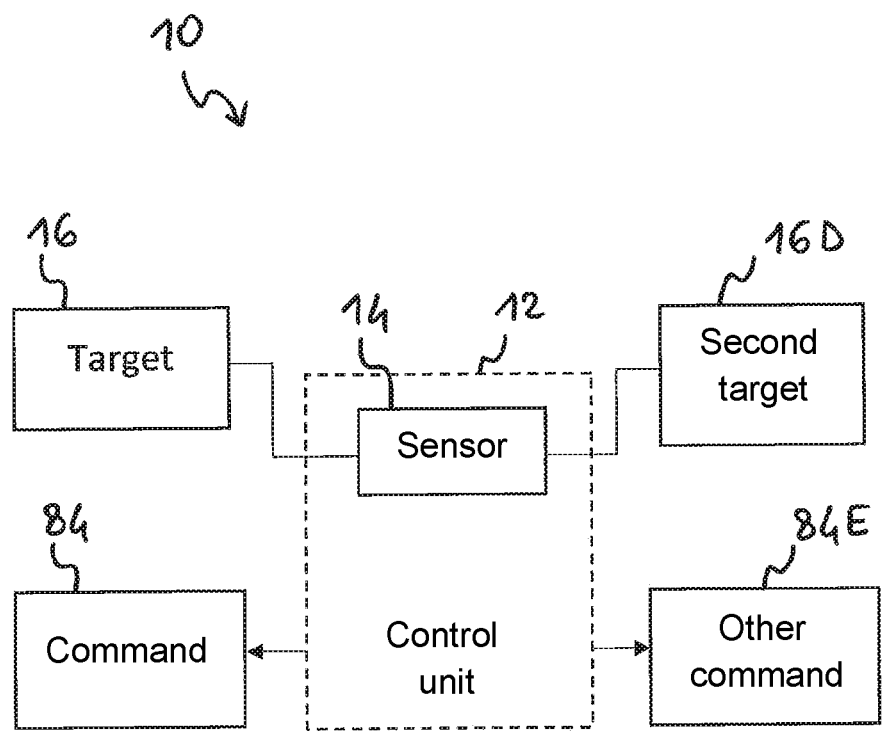

An embodiment is also provided for, represented in FIG. 23, wherein a single sensor 14 is housed in the control unit 12 and responds differently, with the emission of different commands, to two (or more) different targets: the control unit 12 emits command 84 when target 16 enters into/exits from the detection range of sensor 14, and emits command 84E when target 16D enters into/exits from the detection range of sensor 14. As discussed in the introductory part, it is for example possible to use an analogue magnetoresistive sensor, the output of which changes differently depending on whether a target 16 with a positive polarity or a target 16D with a negative polarity enters into its range, or an RFID reader (sensor 14) and two different RFID tags (target 16, 16D).

As stated, preferably the change of state of the sensor 14 is detected substantially independently of a duration of the state in which the target 16 is within its detection range, so as to make the implementation of a logic for checking the exceeding of a time threshold superfluous, obtaining a quick responsiveness of the control device and increased immunity against noise, vibrations or external interference.

Alternatively, the control unit 12 can be configured to measure a duration of the state in which the target 16 is within the detection range of the sensor 14. This can be exploited to generate a different command in the case of a duration longer than a predetermined threshold, preferably a change of operating mode command or a configuration command or, in case the bicycle equipment is a derailleur, a multi-gearshifting command. The second command can be intended for the processor of the control unit 12, for the bicycle piece of equipment for which the main command is intended, or for a different piece of equipment of the bicycle.

A control device 10 as described above can be intended for the right hand of the cyclist, an analogous control device 10 being intended for the left hand of the cyclist. In this manner, the cyclist is capable of controlling a rear derailleur in the two directions, for example when the right control device emits an upward gearshifting command signal and the left control device emits a downward gearshifting command signal; furthermore, a front derailleur having two chainrings can be controlled by receiving the two control signals emitted by the two control devices 10 simultaneously or a time apart shorter than a predetermined threshold.

All possible configurations of the control device 10 will be manifest to those skilled in the art in light of the present description.

Although the invention has been described in detail with reference to a sensor arranged in the control unit of the control device in such a position as to correspond, once the control unit has been fitted on the cyclist's finger, to the fingertip of the same finger, the invention can also be applied to a sensor arranged in the control unit in such a position as to correspond, once the control unit has been fitted on the finger, to the tip of the same finger or to the nail or to a side portion of the fingertip.

Although the invention has been described in detail with reference to an adjustable flexible strap, the invention can also be applied to an elastic flexible strap.

Although the invention has been described in detail with reference to a fixing area of the strap comprising a hook and loop mechanism, the invention can be applied to any suitable fixing mechanism, for example an adjustable clip mechanism, comprising an element of a clip button and a series of matching elements, or two series of matching elements of a clip button.

Although the invention has been described in detail with reference to a flexible printed circuit connecting the sensor to the electric/electronic components housed in the control unit, the invention can also be applied to a suitable number of wires performing the same functions as the flexible printed circuit.

The above is a description of various embodiments of inventive aspects, and further changes can be made without departing from the scope of the present invention. The shape and/or size and/or location and/or orientation of the various components and/or the succession of various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. A bicycle control device, comprising:
   a wearable control unit configured to be worn on a cyclist's finger and configured to generate and emit at least one electrical command to at least one piece of equipment of a bicycle, comprising a power source and a contact sensor powered by the power source, wherein:
   the bicycle control device comprises a target that is physically and electrically distinct from the control unit,
   the contact sensor is configured to detect the target within a predetermined detection range, and
   the control unit generates and emits said at least one electrical command in response to a change of state of the contact sensor caused at least one of: (i) the target entering into the predetermined detection range of the sensor, or (ii) the target exiting from the predetermined detection range of the sensor.

2. The bicycle control device according to claim 1, wherein said sensor and said target are selected from the group consisting of a magnetic sensor and a ferromagnetic target; a capacitive sensor and an electrically conductive target; an optical sensor and a reflective target; an RFID (Radio Frequency Identification) reader or interrogator and a target consisting of a passive RFID tag.

3. The bicycle control device according to claim 1, wherein the target is configured to be wearable on a cyclist's finger.

4. The bicycle control device according to claim 3, wherein the target is part of a ring.

5. The bicycle control device according to claim 1, wherein the target is on a component of the bicycle.

6. The bicycle control device according to claim 1, further comprising at least one duplicate target, wherein the control unit generates and emits a command equal to said command of said at least one electrical command in response to a change of state of the sensor brought about by entry of the duplicate target into the predetermined detection range of the sensor, and/or in response to a change of state of the sensor brought about by exit of the duplicate target from the predetermined detection range of the sensor.

7. The bicycle control device according to claim 1, further comprising a second target of the sensor, physically separate from the control unit and from the target of the sensor and not electrically connected to the control unit, wherein the control unit generates and emits a second command of said at least one electrical command in response to a change of state of the sensor brought about by entry of the second target into the predetermined detection range of the sensor, and/or in response to a change of state of the sensor brought about by exit of the second target from the predetermined detection range of the sensor, the second command of said at least one electrical command being different from said command of said at least one electrical command.

8. The bicycle control device according to claim 1, further comprising a second sensor having a second predetermined detection range, housed in said control unit or in a second control unit, wherein the control unit or the second control unit generates and emits another command of said at least one electrical command in response to a change of state of the second sensor brought about by entry of the target into the second predetermined detection range, and/or in response to a change of state of the second sensor brought about by exit of the target from the second predetermined detection range, said another command of said at least one electrical command being different from said one command of said at least one electrical command.

9. The bicycle control device according to claim 1, further comprising a second sensor having a second predetermined detection range, housed in said control unit, and a second target of the second sensor, physically separate from the control unit and not electrically connected to the control unit, wherein the control unit generates and emits another command of said at least one electrical command in response to a change of state of the second sensor brought about by entry of the second target into the second predetermined detection range, and/or in response to a change of state of the second sensor brought about by exit of the second target from the second predetermined detection range, said another command of said at least one electrical command being different from said command of said at least one electrical command.

10. The bicycle control device according to claim 1, wherein the control unit is in the form of a ring.

11. A bicycle control device comprising:
a wearable control unit for generating and emitting at least one electrical binary command to at least one piece of equipment of a bicycle, comprising a power source and a sensor powered by the power source, wherein:
the bicycle control device comprises a passive target that is physically and electrically distinct from the control unit,
the sensor is configured for detecting the passive target within a predetermined detection range, and
the control unit generates and emits said at least one electrical binary command in response to detecting an absence or a presence of the target within the predetermined detection range.

12. The bicycle control device according to claim 11, wherein said sensor and said target are selected from the group consisting of a magnetic sensor and a ferromagnetic target; a capacitive sensor and an electrically conductive target; an optical sensor and a reflective target; an RFID (Radio Frequency Identification) reader or interrogator and a target consisting of a passive RFID tag.

13. The bicycle control device according to claim 11, wherein the target is configured to be wearable on a cyclist's finger.

14. The bicycle control device according to claim 13, wherein the target is part of a ring.

15. The bicycle control device according to claim 11, wherein the target is on a component of the bicycle.

16. The bicycle control device according to claim 11, further comprising at least one duplicate target, wherein the control unit generates and emits a command equal to said command of said at least one electrical command in response to a change of state of the sensor brought about by entry of the duplicate target into the predetermined detection range of the sensor, and/or in response to a change of state of the sensor brought about by exit of the duplicate target from the predetermined detection range of the sensor.

17. The bicycle control device according to claim 11, further comprising a second target of the sensor, physically separate from the control unit and from the target of the sensor and not electrically connected to the control unit, wherein the control unit generates and emits a second command of said at least one electrical command in response to a change of state of the sensor brought about by entry of the second target into the predetermined detection range of the sensor, and/or in response to a change of state of the sensor brought about by exit of the second target from the predetermined detection range of the sensor, the second command of said at least one electrical command being different from said command of said at least one electrical command.

18. The bicycle control device according to claim 11, further comprising a second sensor having a second predetermined detection range, housed in said control unit or in a second control unit, wherein the control unit or the second control unit generates and emits another command of said at least one electrical command in response to a change of state of the second sensor brought about by entry of the target into the second predetermined detection range, and/or in response to a change of state of the second sensor brought about by exit of the target from the second predetermined detection range, said another command of said at least one electrical command being different from said one command of said at least one electrical command.

19. The bicycle control device according to claim 11, further comprising a second sensor having a second predetermined detection range, housed in said control unit, and a second target of the second sensor, physically separate from the control unit and not electrically connected to the control unit, wherein the control unit generates and emits another command of said at least one electrical command in response to a change of state of the second sensor brought about by entry of the second target into the second predetermined detection range, and/or in response to a change of state of the second sensor brought about by exit of the second target from the second predetermined detection range, said another command of said at least one electrical command being different from said command of said at least one electrical command.

20. A bicycle control device, comprising:
a wearable control unit configured to be worn on a cyclist's finger and configured to generate and emit at least one electrical command to at least one piece of equipment of a bicycle, comprising a power source and a sensor powered by the power source, wherein:
the bicycle control device comprises a first target that is physically and electrically distinct from the control unit,
the sensor is configured to detect the first target within a predetermined detection range, and
the control unit generates and emits a first electrical command in response to a change of state of the sensor caused by at least one of: (i) the first target entering into the predetermined detection range of the sensor, or (ii) the first target exiting from the predetermined detection range of the sensor; and,
a second target of the sensor that is physically separate from the control unit and from the first target of the sensor and not electrically connected to the control unit,
wherein the control unit generates and emits a second electrical command in response to a change of state of the sensor brought about by entry of the second target into the predetermined detection range of the sensor, and/or in response to a change of state of the sensor brought about by exit of the second target from the predetermined detection range of the sensor, the second electrical command being different from said first electrical command.

* * * * *